US008066200B2

(12) United States Patent
Hepner et al.

(10) Patent No.: US 8,066,200 B2
(45) Date of Patent: Nov. 29, 2011

(54) HOLLOW STRUCTURAL MEMBERS, A RAIL SYSTEM AND METHODS OF MANUFACTURING

(75) Inventors: Alan Hepner, Rexford, MT (US); David Metivier, Holladay, UT (US)

(73) Assignee: HillTrac, Inc., Salt Lake City, UT (US)

( * ) Notice: Subject to any disclaimer, the term of this patent is extended or adjusted under 35 U.S.C. 154(b) by 444 days.

(21) Appl. No.: 12/075,619

(22) Filed: Mar. 12, 2008

(65) Prior Publication Data
US 2009/0230205 A1  Sep. 17, 2009

(51) Int. Cl.
*E01B 1/00* (2006.01)

(52) U.S. Cl. ............ 238/2; 238/122; 238/157; 104/118; 104/119; 104/124

(58) Field of Classification Search ................. 104/118, 104/119, 124, 125, 126; 105/141, 144, 29.1; 238/2, 123
See application file for complete search history.

(56) References Cited

U.S. PATENT DOCUMENTS

| | | | |
|---|---|---|---|
| 1,838,204 A | | 12/1931 | Wood |
| 3,583,327 A | * | 6/1971 | Arndt .......................... 104/120 |
| 3,606,839 A | | 9/1971 | Stafford et al. |
| 3,858,518 A | * | 1/1975 | Nyman ........................ 104/124 |
| 3,890,904 A | * | 6/1975 | Edwards ...................... 104/121 |
| 3,891,062 A | | 6/1975 | Geneste |
| 3,985,081 A | | 10/1976 | Sullivan, II |
| 4,000,702 A | | 1/1977 | Mackintosh |
| 4,007,574 A | | 2/1977 | Riddell |
| 4,015,537 A | | 4/1977 | Graef et al. |
| 4,026,388 A | | 5/1977 | Creissels |
| 4,402,272 A | | 9/1983 | Habegger |
| 4,489,659 A | * | 12/1984 | Kamohara et al. ............ 104/124 |
| 4,534,451 A | | 8/1985 | Peter |
| 4,602,567 A | | 7/1986 | Hedström |
| 4,627,517 A | | 12/1986 | Bor |
| 4,690,064 A | | 9/1987 | Owen |
| 4,702,173 A | | 10/1987 | Perrott |
| 4,821,845 A | | 4/1989 | DeViaris |
| 4,909,011 A | * | 3/1990 | Freeman et al. ............. 52/648.1 |

(Continued)

FOREIGN PATENT DOCUMENTS

EP  0 267 411 A2  5/1988

(Continued)

OTHER PUBLICATIONS

ABS Transportbahnen, a member of the Doppelmayr Group, "Funiculars. Inclined Elevators," http://www.transportbahnen.at/e_index.htm.

(Continued)

*Primary Examiner* — Joe Morano, IV
*Assistant Examiner* — Jason C Smith
(74) *Attorney, Agent, or Firm* — Eminent IP, P.C.; Paul. C. Oestreich

(57) ABSTRACT

The invention is hollow structural members, a rail system based thereon and method of manufacturing such hollow structural members. Embodiments of the structural members may be hollow triangular prism-shaped with a cross-section that is triangular, isosceles, hexagonal or otherwise. Embodiments of rail systems based on hollow structural members are also disclosed. Embodiments of the rail systems disclosed herein may also include reaction assemblies for local dissipation of stresses due to thermal expansion of track materials.

20 Claims, 22 Drawing Sheets

U.S. PATENT DOCUMENTS

| | | | |
|---|---|---|---|
| 5,069,141 A | | 12/1991 | Ohara et al. |
| 5,231,933 A | | 8/1993 | DiRosa |
| 5,398,617 A | | 3/1995 | Deandrea |
| 5,419,260 A | | 5/1995 | Hamilton |
| 5,476,156 A | | 12/1995 | Gerber |
| 5,487,450 A | | 1/1996 | Gerber |
| 5,575,215 A | * | 11/1996 | Egli et al. .................. 104/99 |
| 5,590,603 A | * | 1/1997 | Lund ..................... 104/88.04 |
| 5,813,349 A | * | 9/1998 | Jensen ..................... 104/28 |
| 5,845,583 A | * | 12/1998 | Jensen .................. 105/72.2 |
| 5,934,198 A | * | 8/1999 | Fraser .................... 105/144 |
| 5,964,159 A | * | 10/1999 | Hein ....................... 104/128 |
| 5,967,265 A | * | 10/1999 | Bruno et al. ............. 187/201 |
| 6,047,645 A | * | 4/2000 | Cornwell et al. ........ 104/124 |
| 6,053,286 A | * | 4/2000 | Balmer .................. 187/201 |
| 6,113,401 A | * | 9/2000 | Nieminen et al. ......... 439/121 |
| 6,178,891 B1 | * | 1/2001 | Ostholt et al. ............. 104/93 |
| 6,277,473 B1 | * | 8/2001 | McGinn .................. 428/188 |
| 6,321,657 B1 | * | 11/2001 | Owen ...................... 104/119 |
| 6,490,979 B1 | * | 12/2002 | Pfleger et al. ........... 104/172.3 |
| 6,666,147 B1 | * | 12/2003 | Minges ................... 104/128 |
| 6,739,430 B2 | * | 5/2004 | Hill ......................... 187/245 |
| 6,938,391 B1 | * | 9/2005 | Patel ......................... 52/846 |
| 7,063,763 B2 | * | 6/2006 | Chapman, Jr. ............ 156/175 |
| 7,066,094 B2 | * | 6/2006 | Moutsokapas et al. ....... 104/124 |
| 7,127,999 B2 | * | 10/2006 | Roane ...................... 105/72.2 |
| 7,334,524 B2 | * | 2/2008 | Roane ........................... 104/2 |
| 2001/0045326 A1 | * | 11/2001 | Gottlieb et al. ............. 187/254 |
| 2003/0097982 A1 | * | 5/2003 | Ehrenleitner et al. ........ 118/423 |
| 2004/0011242 A1 | * | 1/2004 | Roane ..................... 105/72.2 |
| 2004/0149158 A1 | * | 8/2004 | Keller et al. ................. 104/89 |
| 2004/0168605 A1 | * | 9/2004 | Minges ........................ 104/178 |
| 2005/0091825 A1 | * | 5/2005 | Fuks et al. ..................... 29/463 |
| 2006/0178221 A1 | * | 8/2006 | Threlkel ........................... 472/1 |
| 2007/0151193 A1 | * | 7/2007 | Stonecypher ................... 52/638 |
| 2008/0121133 A1 | * | 5/2008 | Sousa Jaques ............. 104/173.2 |
| 2009/0084863 A1 | * | 4/2009 | Sorenson ........................ 238/122 |
| 2009/0230205 A1 | * | 9/2009 | Hepner et al. ..................... 238/2 |
| 2009/0288578 A1 | * | 11/2009 | Hepner et al. .................. 105/141 |

FOREIGN PATENT DOCUMENTS

| | | |
|---|---|---|
| WO | WO 97/19887 | 6/1997 |
| WO | WO 98/34867 | 8/1998 |

OTHER PUBLICATIONS

Access Automation Ltd., hftp://www.accessauto.co.nz/index.php.
Access Lift, LLC, http://www.accessliftllc.com.
ACCUMAR Corporation, http://www.accumar.com.
American Recreational Tram Systems, Inc., http://www.americantram.com/index.htm.
Coaster GmbH, http://www.coaster.at/de/referenzen/referenzen.asp.
The Dock Doctors, "Hillside Elevator," http://www.thedockdoctors.com/custom/hillside_elevators.html.
Funimag, "the first web magazine about funiculars," http://www.funimag.com/Funimag-Manufacturers.htm.
Hill Hiker, Inc., http://www.hillhiker.com/index.html.
Hillside Elevator, Inc., http://www.hillsideelevator.com.
Hütter Aufzüge, http://www.huetter-elevators.com/elevators/inclined-elevators.htm.
Inauen-Schaetti AG, "Crosslift," http://www.schraegaufzug.com/99.0.html.
Inauen-Schaetti AG, "Crossliner," http://www.schraegaufzug.com/106.0.html.
Inauen-Schaetti AG. "Inclined Elevator Crosslift Telluride, USA," http://www.schraegaufzua.com/153.0.html.
Inauen-Schaetti AG. "Inclined Elevator Crosslift Tennessee, USA," http://www.schraegaufzug.com/152.0.html.
InclinedElevation, Inc. http://www.inclinedelevation.com.
Inclined Elevation, Inc., http://www.inclinedelevation.com/whatsinaname.html.
Lake Shore Tram, Inc., http://www.lakeshoretram.com.
Leitner AG, "Shrägaufzüge," http://www.leitner-lifts.com/photobook.asp?L=2&idmen=147&CAT=18.
Leitner-Poma of America, Inc., "APMs and Inclined Elevators," http://www.pomagroup.com/Apm.htm.
Levelator Incline Lifts, Inc., "Hillside Glider," http://www.hillsideglider.com; User Manual.
Liftbyggarna AB, "Bergbanor (Funicular)," http://home.smelinkweb.com/liftbyggarna%2Deng.
Marine Innovations, Inc., http://ww.marineinnovations.com/index.html.
Maspero Elevatori, "Dual Rail Constant Inclination," http://www.maspero.com/inglese/IMMAGINI/popup/inclined/inclined10.jpg.
Maspero Elevatori, "Dual Rail Constant Inclination," http://www.maspero.com/inglese/IMMAGINI/popup/inclined/inclined11_2.jpg.
Maspero Elevatori, "Dual Rail Constant Inclination," http://www.maspero.com/inglese/IMMAGINI/popup/inclined/inclined06.jpg.
Munson Works, http://www.munsonworks.com/munson/index.html.
Muskoka Elevation, a division of Canadian Hillside Lift, Inc., "Outdoor hillside lifts for Canadian homes," http://www.hillsidelift.com.
Nikkari Co. Ltd., http://www.nikkari.co.jp/english/product/monorack/catalog/jyoyo/e-wanman.html.
NSD Lift AG, "Dual Rail Inclinators," http://www.nsd.ch/pages_en/einsatzgebiet.asp.
Parc d'Activités, "Skirail," http://www.poma.net/francais/poma/monde/filialesindus/skirail/main.htm.
Plant Technology CC, http://www.planttechnology.co.za/funicular.htm.
P.R. King & Sons PTY LTD., "Inclinator," www.prking.com.au.
Wikipedia, "Rack Railway," http://en.wikipedia.org/wiki/Rack_railway.

* cited by examiner

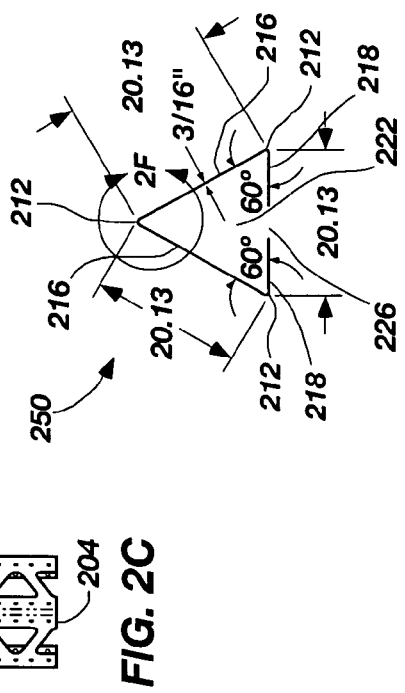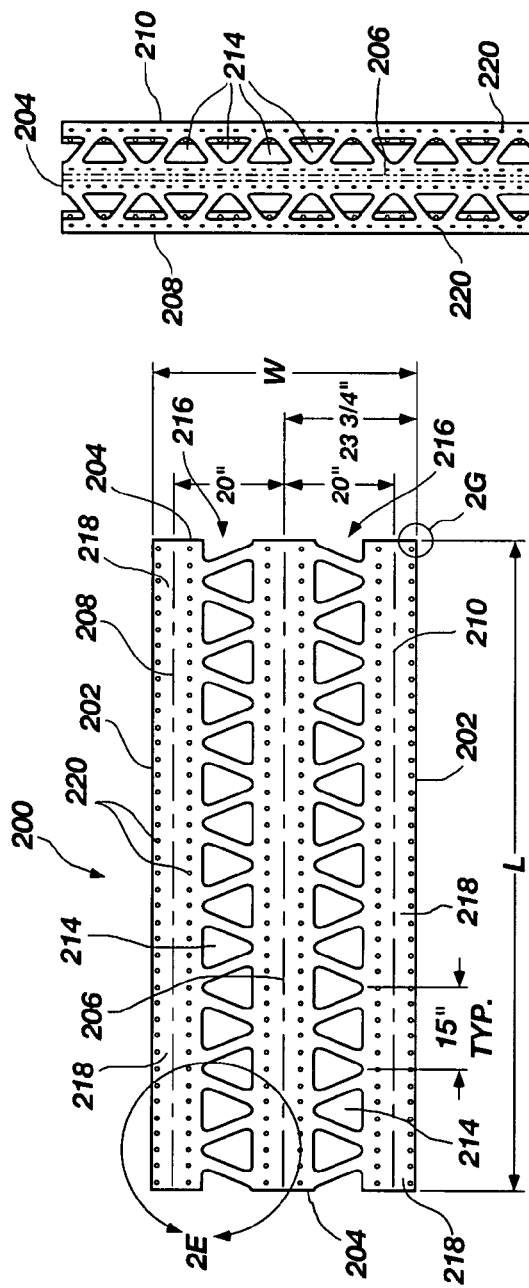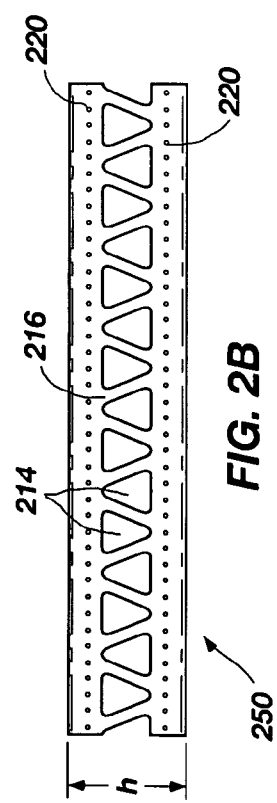

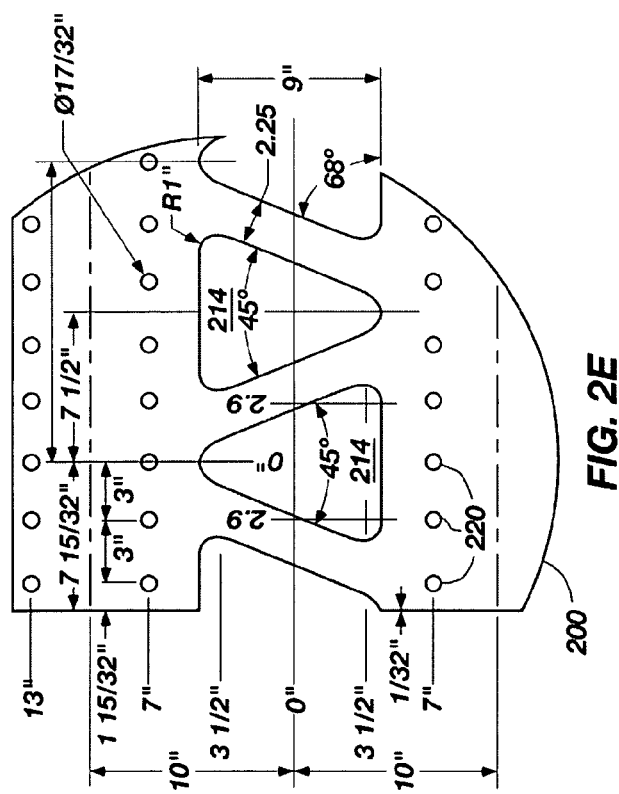
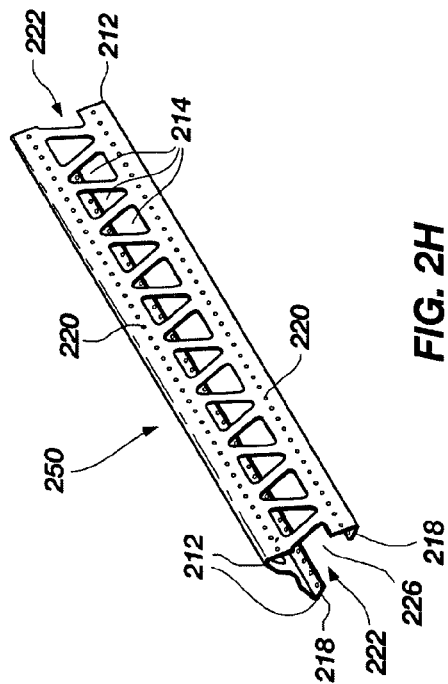
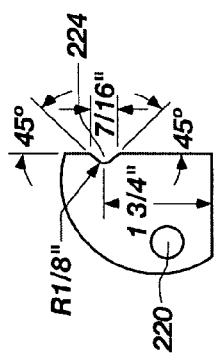
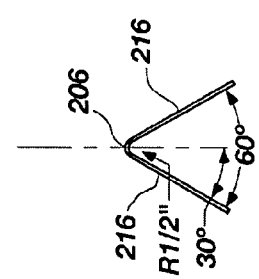
FIG. 2H
FIG. 2G
FIG. 2E
FIG. 2F

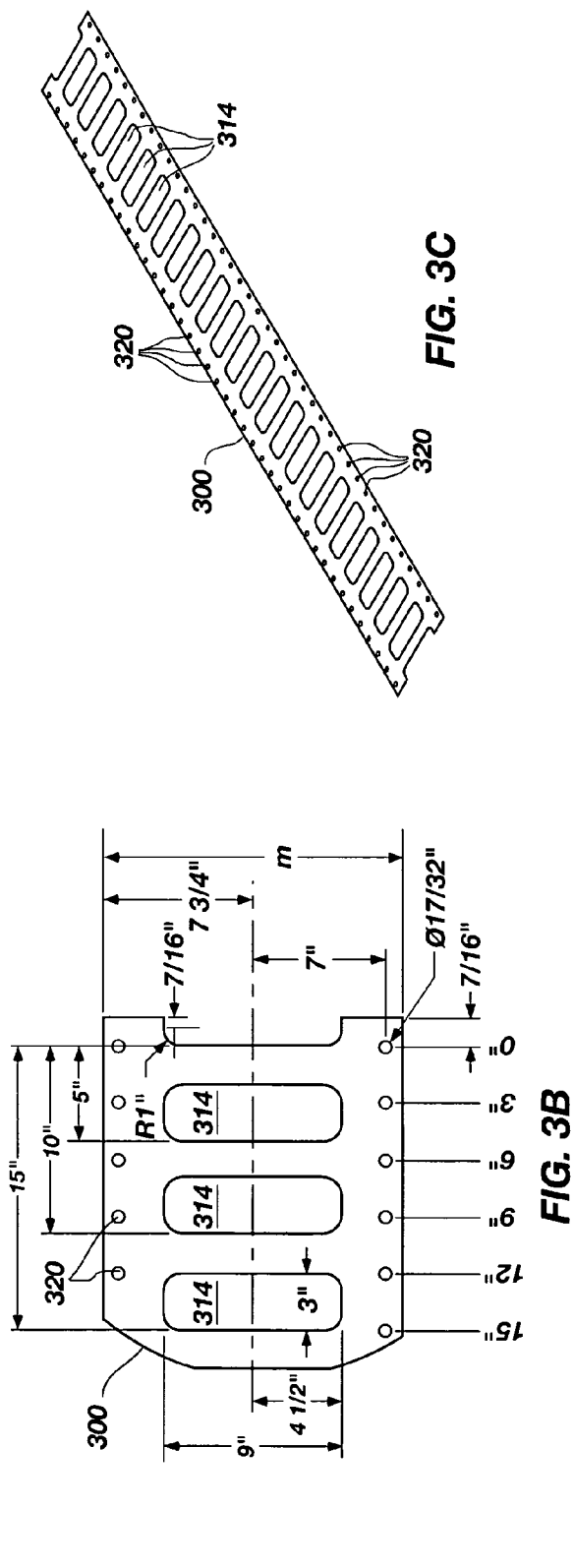
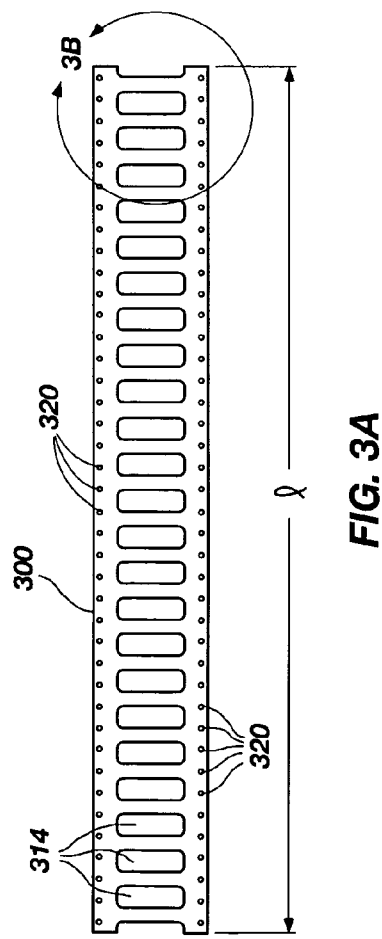
FIG. 3C
FIG. 3B
FIG. 3A

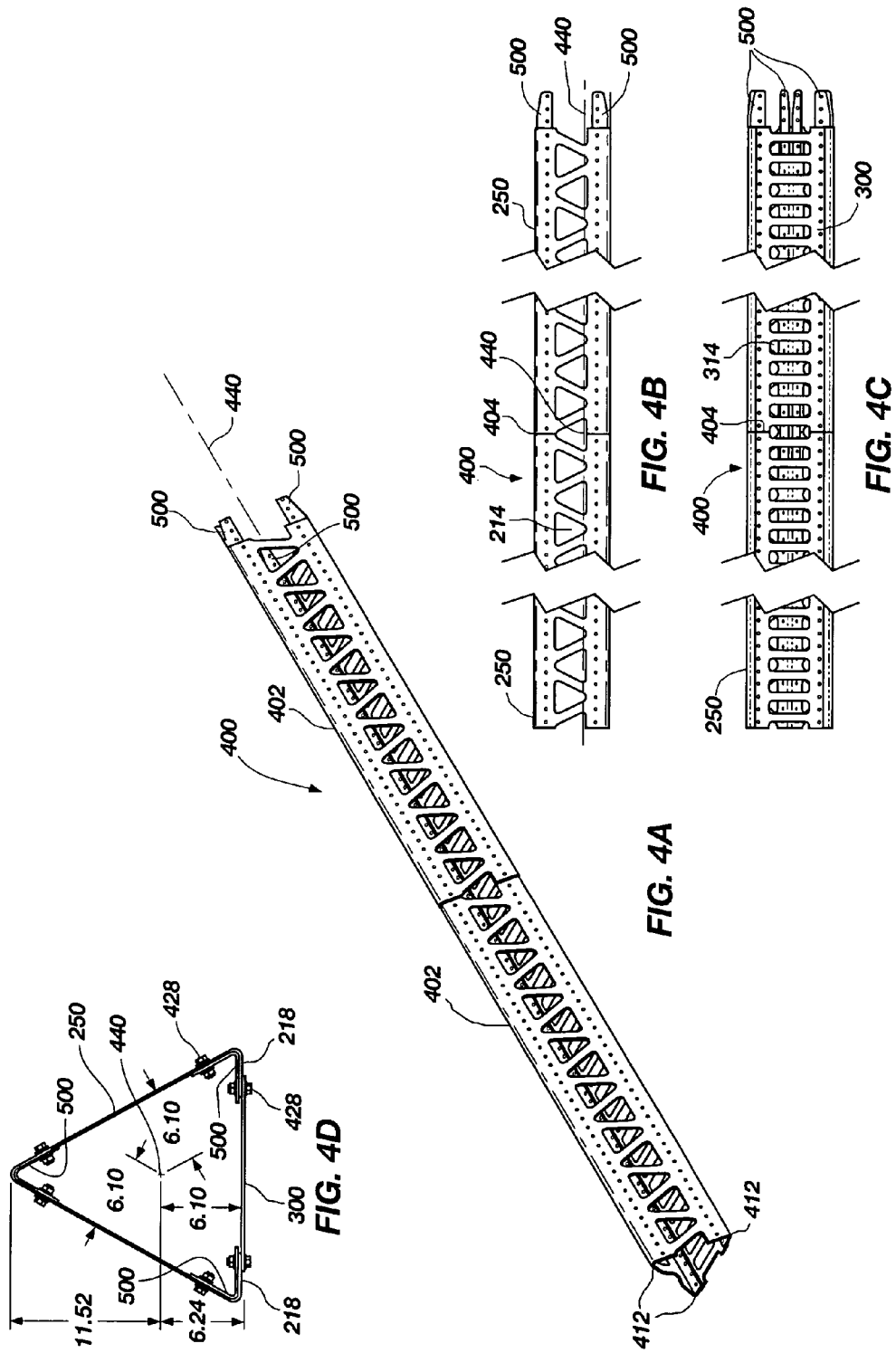

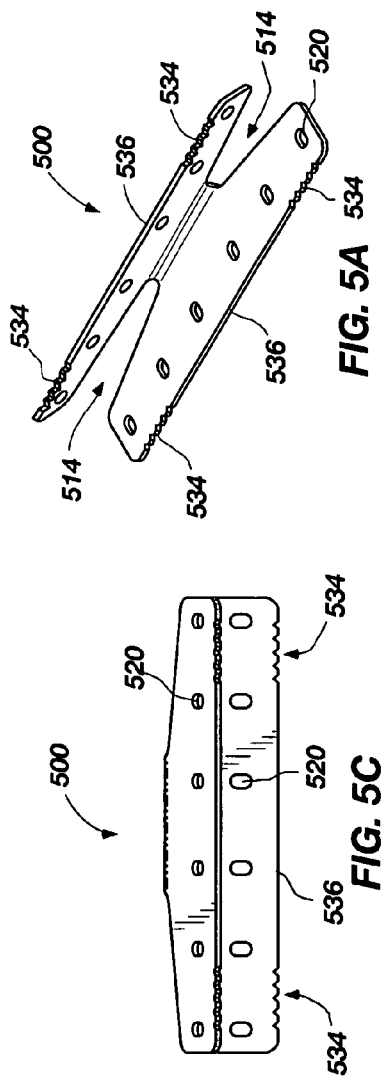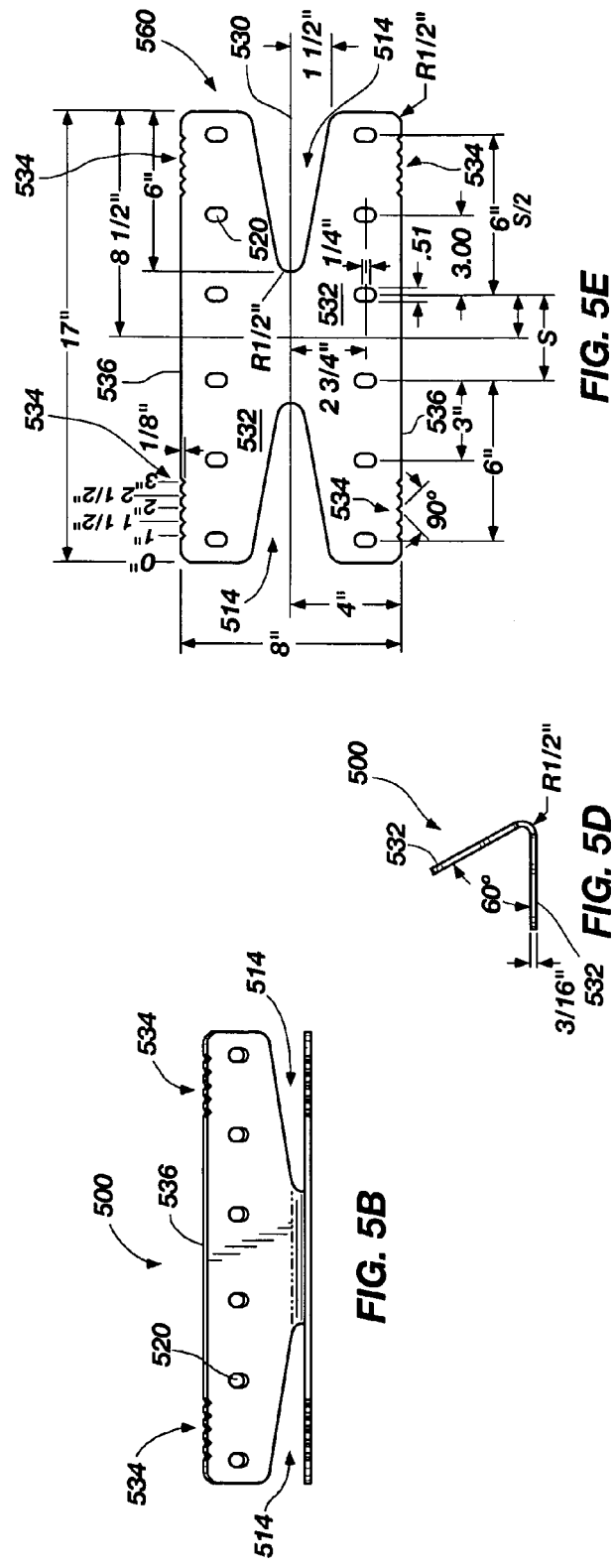

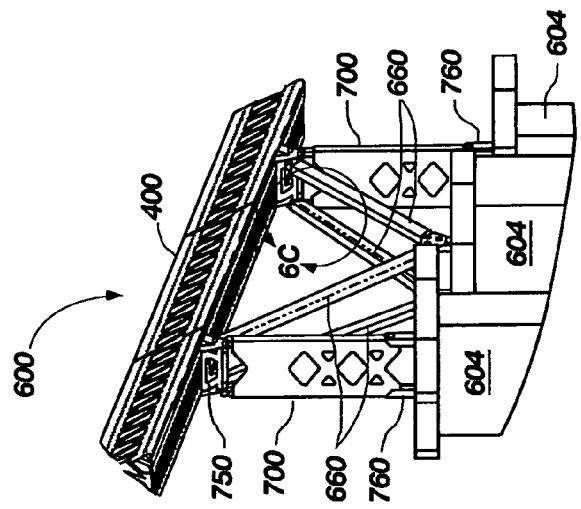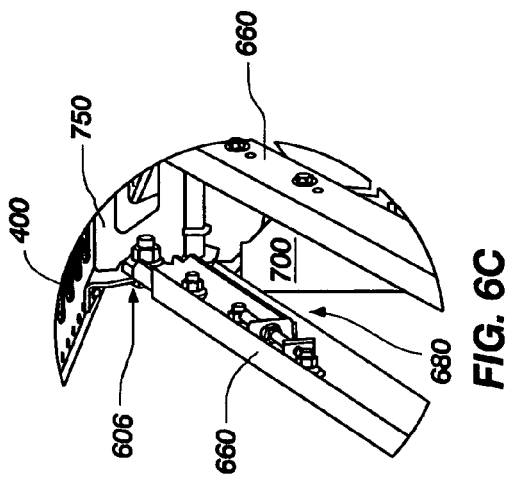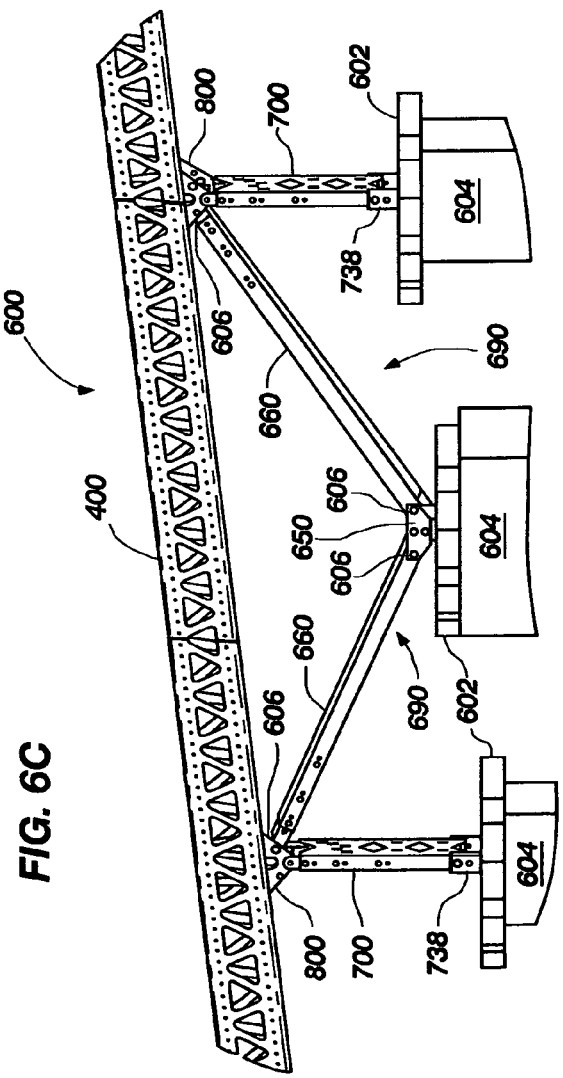

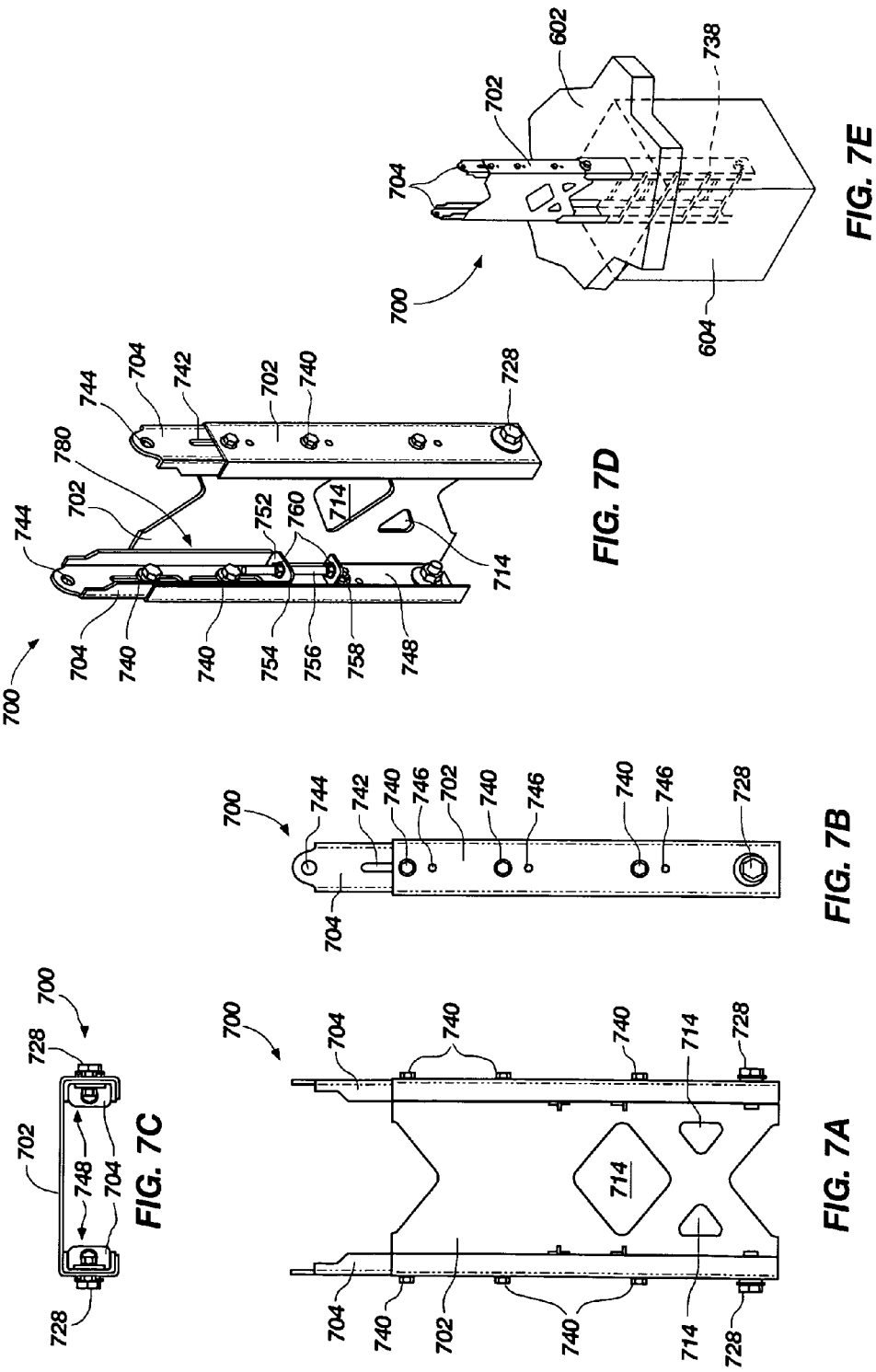

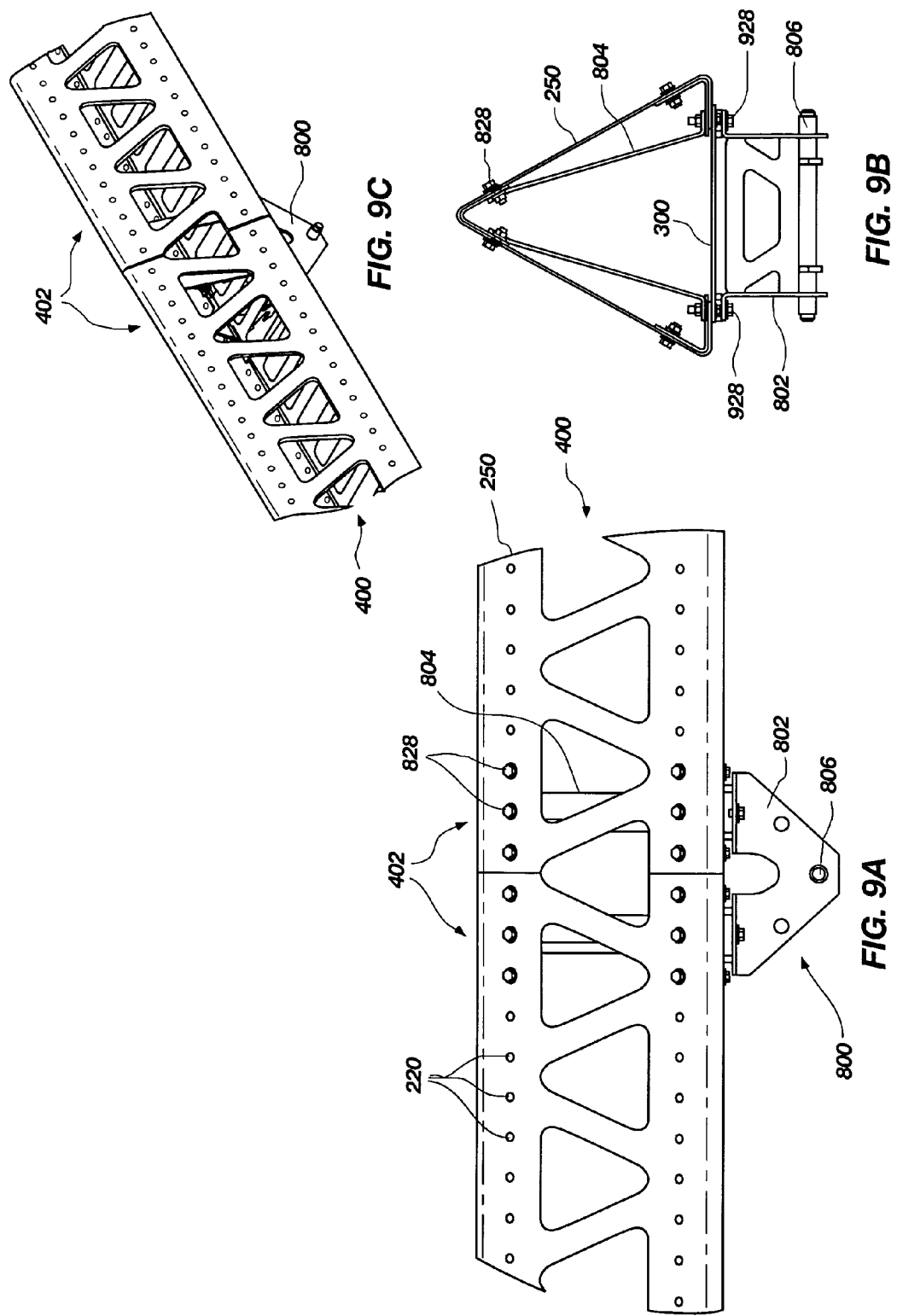

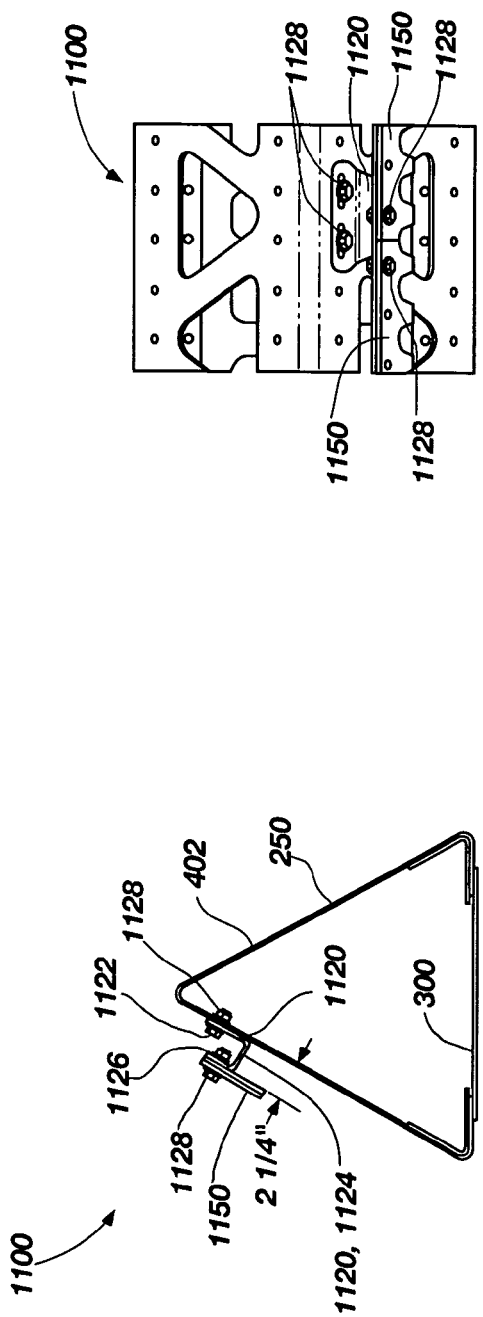
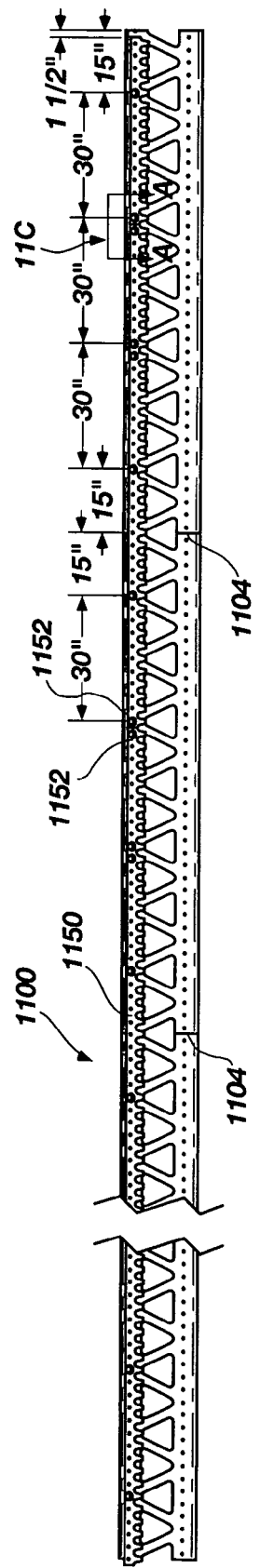
FIG. 11C
FIG. 11A
FIG. 11B

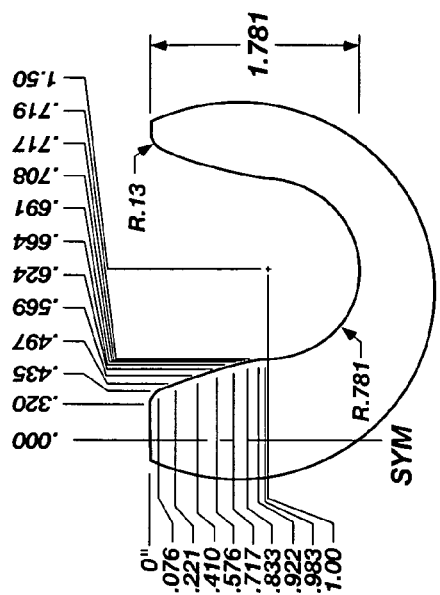
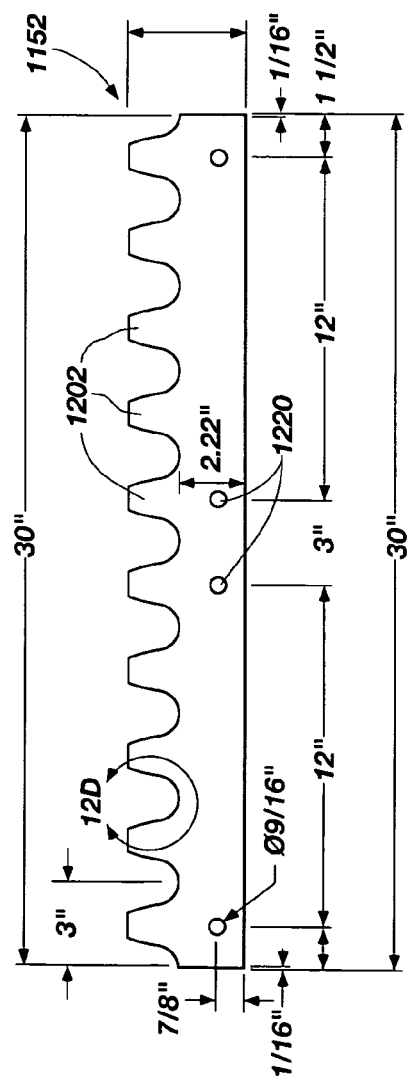
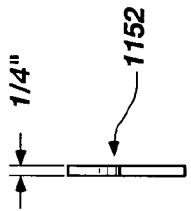
FIG. 12D
FIG. 12C
FIG. 12B
FIG. 12A

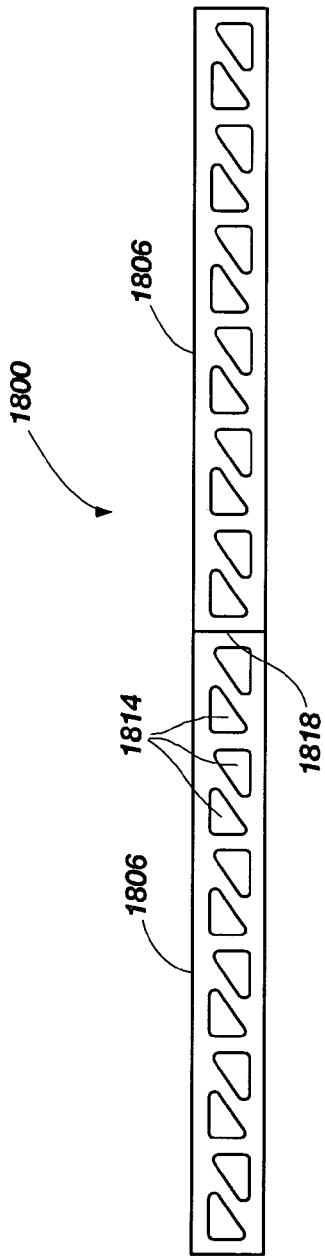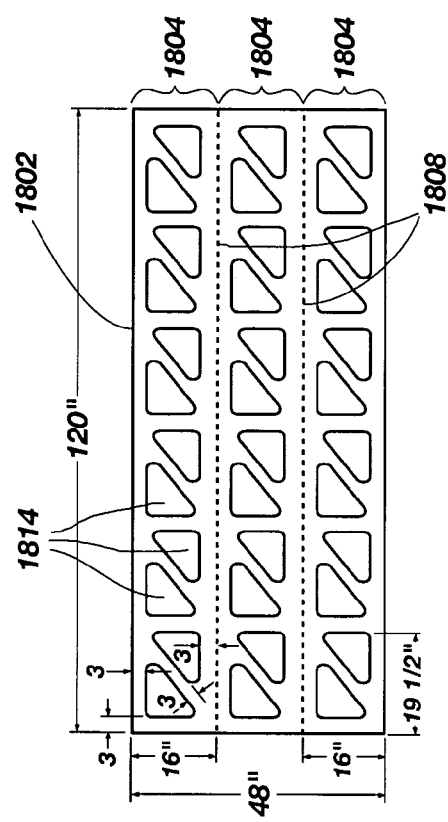
FIG. 18A
FIG. 18B

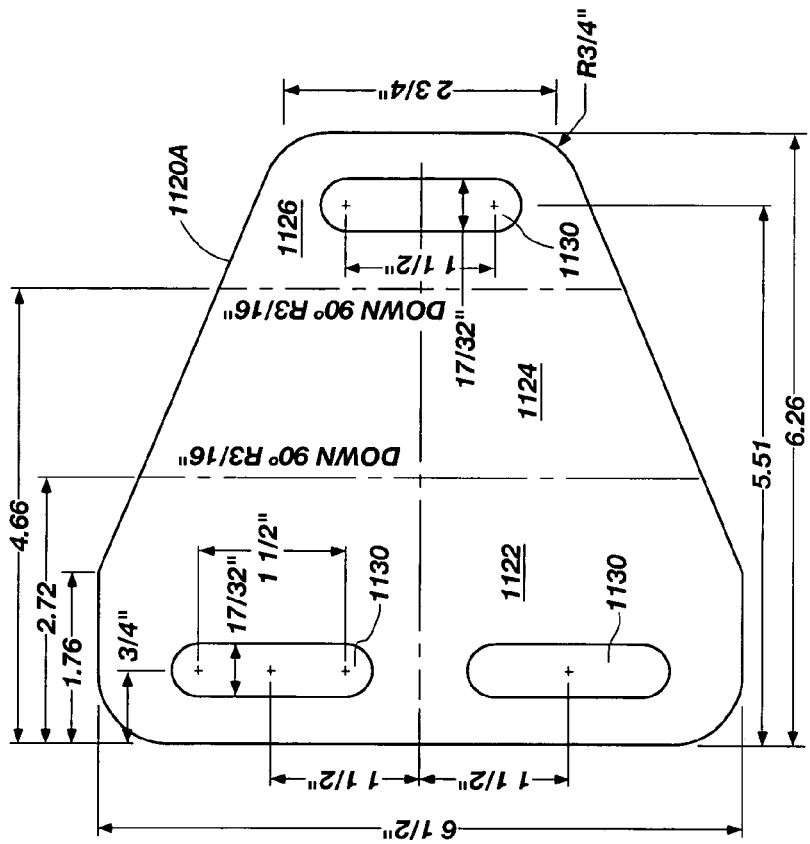
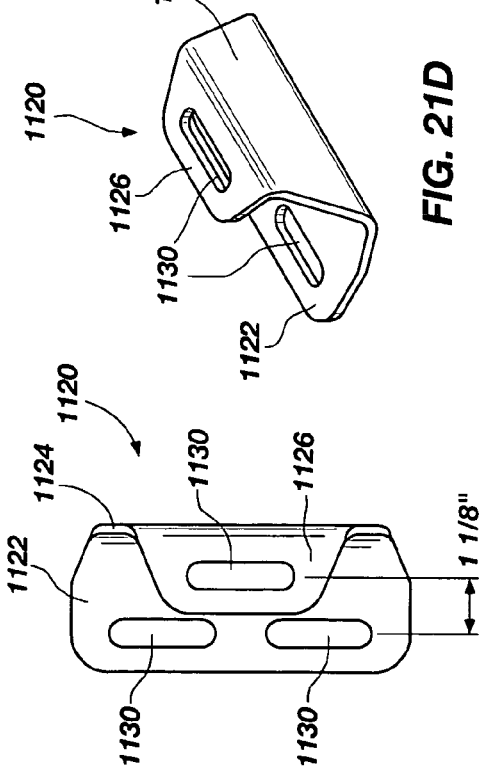
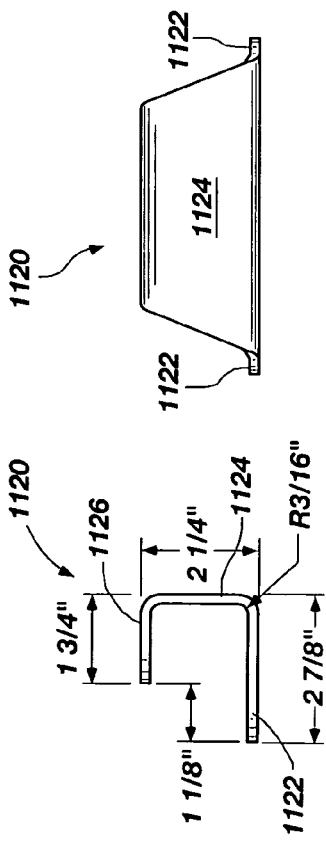

HOLLOW STRUCTURAL MEMBERS, A RAIL SYSTEM AND METHODS OF MANUFACTURING

BACKGROUND OF THE INVENTION

1. Field of the Invention

This invention relates generally to structural members particularly useful for railed transportation systems. More particularly, the invention relates to a hollow structural members, a rail system based thereon and methods of manufacturing such hollow structural members.

2. Description of Related Art

Railed transportation systems are well known in the art. Most conventional railways for transportation of people, goods and other resources rely on friction between the drive wheels and rails. Such conventional rail transportation systems may not be suitable for use on steep grades where traction may become a problem. To compensate for the lack of necessary friction, various elaborate multiple-wheeled and spring-loaded friction-based rail transportation systems have been devised, such as those described in U.S. Pat. No. 4,602,567 to Hedström, U.S. Pat. No. 5,069,141 to Ohara et al., U.S. Pat. No. 5,231,933 to DiRosa, U.S. Pat. No. 5,419,260 to Hamilton, U.S. Pat. No. 5,964,159 to Hein, U.S. Pat. No. 6,053,286 to Balmer, U.S. Pat. No. 6,666,147 to Minges and U.S. Patent Application Publication No. 2004/0168605 to Minges. However, these systems are inherently complex mechanical systems.

For applications where steep grades are the norm, railed transportation systems may rely on a toothed rack rail, usually between the running rails in a system known variously as a "cog railway", a "rack-and-pinion railway" or simply, "rack railway". Trains operated on a rack railway are generally fitted with one or more cog wheels or pinions that mesh with the rack rail for driving the train along the track. However, such rack railway systems suffered from derailments when the cog wheel slipped out of the teeth in the rail rack. Additionally, the rail rack itself was expensive to produce and maintain. Furthermore, switches for rack railways were more complex because of the rail rack.

In other approaches to driving over steep gradients, railed transportation systems may rely on other drive mechanisms such as cables and chain-driven systems to pull a car up a track, or to lower it down a track on a steep incline. Examples of conventional cable-driven, railed transportation systems include U.S. Pat. No. 3,891,062 to Geneste, U.S. Pat. No. 4,026,388 to Creissels, U.S. Pat. No. 4,534,451 to Peter, U.S. Pat. No. 4,821,845 to DeVaiaris and U.S. Pat. No. 6,739,430 to Hill. A variation on the cable-driven systems are those which utilize a chain-drive mechanism such as that disclosed in U.S. Pat. No. 1,838,204 to Wood and U.S. Pat. No. 4,627,517 to Bor. While these cable and chain-driven systems tend to be simpler than the friction-based systems for inclined applications, they do not lend themselves well to applications that include turns and changes in inclination because of the nature of cable and chain-driven drives. More specifically, it is difficult to configure a chain or cable for driving a car over a track having turns and changes in inclination because the force exerted by a chain or cable is linear in nature.

Thermal expansion of steel and other track materials has been a limiting factor for simple track design for many years. For example, in the intermountain west, a 120° F. temperature differential may result in approximately one inch of track expansion per 100' of track. If such expansion is not accounted for through stronger reinforcements and supports, the result can be bowing or buckling of the track due to thermal expansion. For this reason, track lengths have been limited to short lengths in most conventional elevator and funicular equipment applications.

One method of dealing with track expansion is to capture the expansion between structural members. This method requires the use of larger foundations and structural members for the track supports to withstand the stresses built up between captured points of the track. This thermal expansion results in a deflection of the track between the captured points. This deflection may cause the track to bend, twist, or at worst case, buckle the track or supports, all of which are undesirable. The deflection also causes additional stresses to all connections including fasteners and connection brackets and/or weldment points requiring the strengthening of these connections. Over time with the increase in thermal cycles, the potential for premature failure of these connection or weldment locations generally increases, resulting in an undesirable failure. The design, manufacturing and installation costs for both labor and materials to compensate for this thermal expansion all increase as a result. For these reasons, the reinforcement method is not preferred as it creates considerable design challenges and increases the economic cost to the system.

Another approach to solving the thermal expansion problem in tracks relies on low-friction clamping systems. The low-friction clamping system allows the track to expand and contract while keeping the track constrained at the supports. For example, this method can utilize dissimilar materials in the clamp, or a roller and bearing assembly. This approach requires a low enough coefficient of friction to allow movement of the track while remaining constrained. A low-friction clamping system is susceptible to contamination and requires additional maintenance to ensure free movement in the track system. This method, while achieving a desired result for reducing the stresses in a long track system, is complicated and requires significant maintenance for long-term operation. For these reasons, the low-friction clamping system approach is not preferred because of the additional maintenance and expense to operate such an intricate system.

Thus, there is a need in the art for a modular track or rail system that can traverse an unlimited track length. It would be advantageous if the track were formed from a plurality of lightweight hollow structural members. It would also be advantageous to have a rail system that is not limited by inclination of the terrain over which it is constructed. It would also be advantageous to have a rail system that is virtually unlimited in curvature of the track. It would also be advantageous to have a rail system that can compensate for thermal expansion without resorting to the additional expense and maintenance of the reinforced support or low-friction clamping methods of the prior art.

SUMMARY OF THE INVENTION

A method of forming a hollow triangular prism-shaped structural member is disclosed. The method may include forming a rectangular main panel having two long edges and two short edges and a first fold line bisecting the main panel along a lengthwise centerline between and parallel to the two long edges, the main panel further including second and third fold lines each disposed parallel to and a predetermined distance from each of the two long edges. The method may further include bending the main panel generally along the first fold line to form an inside angle of about 60° to form a V-shaped cross-section. The method may further include bending the main panel generally along the second fold line to form a first lip having an inside angle of about 60°, the first lip extending toward the third fold line and partially enclosing space inside the V-shaped cross-section. The method may further include bending the main panel generally along the third fold line to form a second lip having an inside angle of about 60°, the second lip extending from the third fold line toward and generally parallel to the first lip and further partially enclosing the space inside the V-shaped cross-section. The method may further include forming an elongated rectangular base panel. The method may further include connecting the elongated rectangular base panel to the first and second lips of the rectangular main panel to form a closed hollow triangular prism-shaped structural member.

A rail system is disclosed. The rail system may include a plurality of hollow triangular prism-shaped rail segments. Each rail segment may include a triangular prism-shaped structural member having an equilateral triangular-shaped cross-section, wherein one side of the equilateral triangle includes a gap between two opposed co-planar lips extending from adjacent vertices and an elongated rectangular base panel connected to the lips of the structural member thereby closing the gap. The rail system may further include a plurality of coupling bars configured for attaching the plurality of rail segments end-to-end from inside adjacent vertices of adjacent end-to-end rail segments to form a track.

Another embodiment of a rail system is disclosed. The rail system may include a track formed of a plurality of elongated hollow structural members joined end-to-end. The rail system may further include a plurality of vertical supports for elevating the track above concrete foundations formed in the ground. The rail system may further include at least one reaction assembly placed between adjacent vertical supports, the track and the concrete foundations having pivot points near the track and having pivot points near the concrete foundations, the reaction assembly allowing for local containment of stresses due to thermal expansion of the track.

Additional features and advantages of the invention will be set forth in the description which follows, and in part will be apparent from the description, or may be learned by the practice of the present invention.

BRIEF DESCRIPTION OF THE DRAWINGS

To further clarify the advantages and features of the present invention, a more particular description of the invention will be rendered by reference to specific embodiments thereof that are illustrated in the appended drawings. It will be appreciated that these drawings depict only typical embodiments of the invention and are therefore not to be considered limiting of the scope of the invention. The invention will be described and explained with additional specificity and detail through the use of the accompanying drawings.

FIG. 2A is a top view of an embodiment of a rectangular main panel used to form a triangular cross-sectioned member according to the present invention.

FIG. 2B is a side view of a hollow triangular prism-shaped structural member formed from the rectangular main panel of FIG. 2A, according to the present invention.

FIG. 2C is a top view of the hollow triangular prism-shaped structural member shown in FIG. 2B.

FIG. 2D is an end view of the hollow triangular prism-shaped structural member shown in FIG. 2B.

FIG. 2E is a detailed view of a portion of the rectangular main panel as indicated on FIG. 2A.

FIG. 2F is a detailed view of the centerline or first fold of the hollow triangular prism-shaped structural member shown in FIG. 2B.

FIG. 2G is another detailed view of a portion of the rectangular main panel as indicated on FIG. 2A.

FIG. 2H is a perspective view of a hollow triangular prism-shaped structural member formed from the rectangular main panel of FIG. 2A, according to the present invention.

FIGS. 3A-C illustrate top, detailed and perspective views of an embodiment of an elongated rectangular base panel according to the present invention.

FIGS. 4A-D illustrate perspective, side, bottom and end views of an embodiment of a track according to the present invention.

FIGS. 5A-D illustrate perspective, front, top and end views of an embodiment of a coupling bar according to the present invention.

FIG. 5E illustrates a top view of a coupling bar form from which the coupling bar shown in FIGS. 5A-D may be formed, according to an embodiment of the present invention.

FIG. 6A illustrates a portion of a track elevated from the ground by vertical supports and a reaction assembly according to an embodiment of the present invention.

FIG. 6B illustrates an angled perspective view of the elevated rail system shown in FIG. 6A.

FIG. 6C illustrates a detailed portion of the lateral support adjustment assembly circled in FIG. 6B.

FIGS. 7A-D illustrate front, top, side and perspective views of an embodiment of a vertical support according to the present invention.

FIG. 7E illustrates a perspective transparent view of a vertical support mounted in a concrete form.

FIGS. 9A-C illustrate front, cross-section and perspective views of the attachment of a vertical support bracket to adjacent rail segments of a track according to an embodiment of the present invention.

FIGS. 11A-C illustrate side, end and detailed top views of a track with a rack according to embodiments of the present invention.

FIGS. 12A-D illustrate front, top, side and detailed views of an embodiment of a rack segment, according to the present invention.

FIGS. 18A-B illustrate yet another embodiment of a triangular prism-shaped rail segment formed of a single sheet of material, according to the present invention.

FIGS. 21A-E illustrate front, top, side and perspective views of rack bracket and a flat template from which a rack bracket may be patterned and formed according to an embodiment of the present invention.

DETAILED DESCRIPTION OF THE INVENTION

Reference will now be made to figures of embodiments of the present invention wherein like structures will be provided with like reference designations. It is understood that the drawings are diagrammatic and schematic representations of exemplary embodiments of the present invention and are neither limiting of the present invention nor are they necessarily drawn or shown to scale.

Embodiments of the present invention are directed to a novel hollow triangular prism-shaped structural member and methods of forming same. This triangular cross-sectioned member is particularly useful as an assembly that may form a track upon which a car may ride. However, it will be evident that there are many other applications for such a light weight structural member, for example a radio tower.

Figure 1:
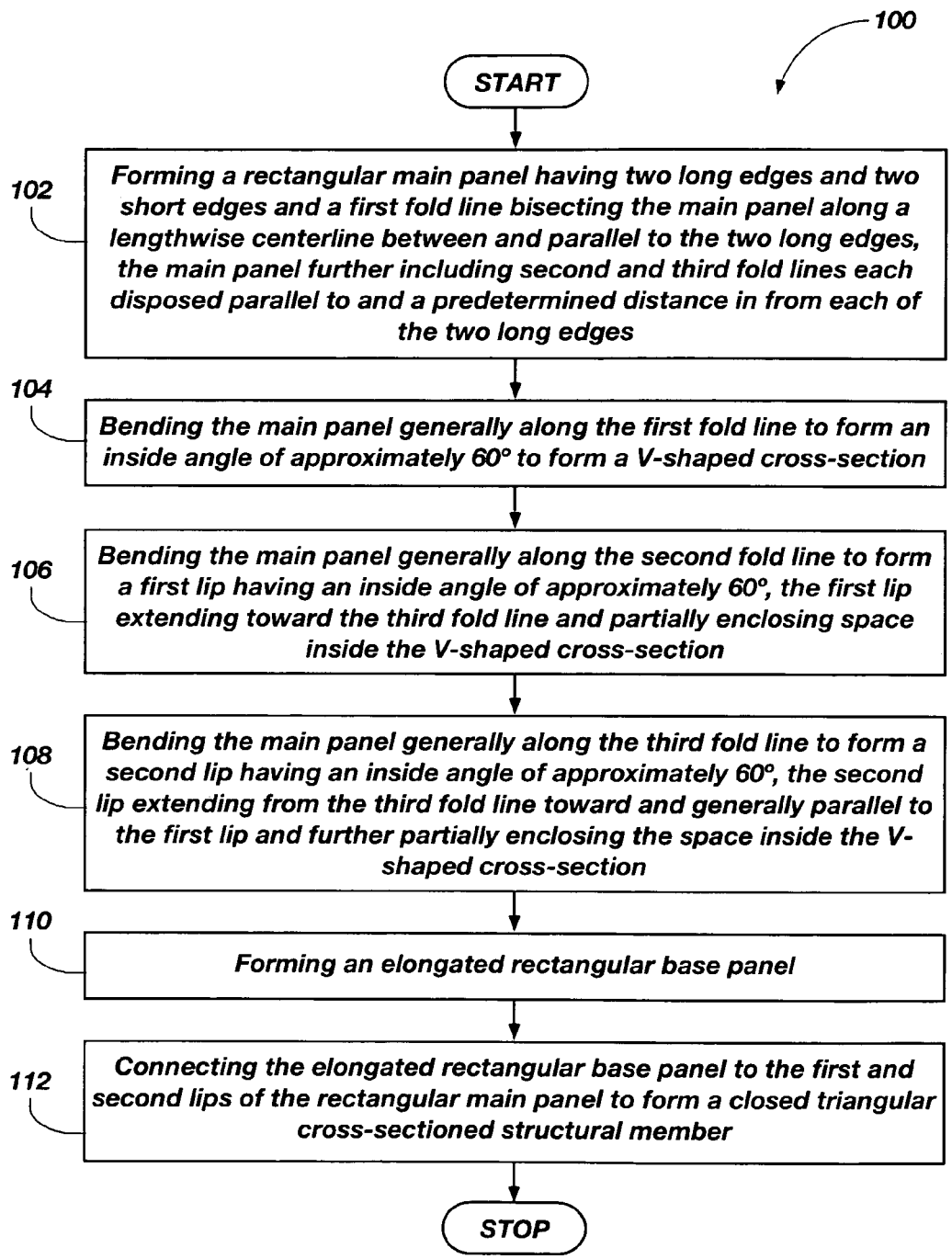
FIG. 1 is a flowchart of an embodiment of a method of forming a hollow triangular prism-shaped structural member, according to the present invention.

FIG. 1 is a flowchart of an embodiment of a method 100 of forming a hollow triangular prism-shaped structural member, according to the present invention. Method 100 may include forming 102 a rectangular main panel having two long edges and two short edges and a first fold line bisecting the main panel along a lengthwise centerline between and parallel to the two long edges, the main panel further including second and third fold lines each disposed parallel to and a predetermined distance from each of the two long edges. Method 100 may further include bending 104 the main panel generally along the first fold line to form an inside angle of approximately 60° to form a V-shaped cross-section. Method 100 may further include bending 106 the main panel generally along the second fold line to form a first lip having an inside angle of approximately 60°, the first lip extending toward the third fold line and partially enclosing space inside the V-shaped cross-section. Method 100 may further include bending 108 the main panel generally along the third fold line to form a second lip having an inside angle of approximately 60°, the second lip extending from the third fold line toward and generally parallel to the first lip and further partially enclosing the space inside the V-shaped cross-section. Method 100 may further include forming 110 an elongated rectangular base panel. Method 100 may further include connecting 112 the elongated rectangular base panel to the first and second lips of the rectangular main panel to form a generally closed triangular cross-sectioned structural member or hollow triangular prism.

According to another embodiment of method 100, forming 102 the rectangular main panel may further include forming cut-outs in the rectangular main panel between the fold lines. The cut-outs reduce the weight of the hollow triangular prism-shaped structural member and also the cost associated with the material from which it is formed, generally steel. Any suitable material may be used to form the hollow triangular prism-shaped structural member, for example and not by way of limitation, galvanized steel, stainless steel, carbon steel, aluminum, fiberglass and composite structures. The bending procedures 104, 106, 108 of method 100 may be performed on the metal materials described, either during forging or during cold stamping, bending and roll forming processes known to those of skill in the art. It will be understood that the bending procedures 104, 106, 108 of method 100 may also be performed in situ around a form during construction where composite materials such as fiberglass and graphite are used.

According to another embodiment of method 100, forming 102 the rectangular main panel may further include forming mounting holes in the rectangular main panel. Mounting holes formed along the lips may be used with mating holes formed on the elongated rectangular base panel for securing the two panels together using nuts and bolts. Mounting holes formed closer to the centerline of the rectangular main panel may be used for mounting a rack used to propel a vehicle along a track formed of the hollow triangular prism-shaped structural member. Mounting holes may be used to attach radio antennas in a radio tower application for a particular assembly of the hollow triangular prism-shaped structural members. According to various embodiments, the mounting holes may be formed in rows parallel to the fold lines. For example, a row of mounting holes may be placed on each of the lips of the rectangular main panel for use in attaching the elongated rectangular base panel. According to another exemplary embodiment, rows of mounting holes may be placed a specified distance from the center line of the rectangular main panel for mounting a rack for use in a track application.

According to another embodiment of method 100, forming 110 the elongated rectangular base panel may further include forming cut-outs in the elongated rectangular base panel. This cut-out feature may be used to reduce weight and allow wind and water to pass through the hollow triangular prism-shaped structural members and yet retain necessary rigidity. The cut-outs may take any suitable shape or pattern. Furthermore, the cut-outs may be drilled, laser cut, stamped, or formed using any other suitable method of forming such cut-outs known to those skilled in the art.

According to another embodiment of method 100, connecting 112 the elongated rectangular base panel to the first and second lips of the rectangular main panel may be accomplished by bolting the panels together using mounting holes formed in each panel. According to an alternative embodiment of method 100, connecting 112 the elongated rectangular base panel to the first and second lips of the rectangular main panel may be achieved by welding the panels together. It will be understood that other methods of attaching the lips of the rectangular main panel to the elongated base panel will be readily apparent to one of ordinary skill in the art and are considered to be within the scope of the present invention.

Method 100 may be used to form a rail system by further joining end-to-end a plurality of the hollow triangular prism-shaped structural members formed according to method 100 described above. The rail system application is not the only presently perceived application for the hollow triangular prism-shaped structural members formed by method 100. Method 100 may be used to form a radio tower by joining end-to-end a plurality of the hollow triangular prism-shaped structural members formed according to method 100.

FIG. 2A illustrates a top view of an embodiment of a rectangular main panel 200 used to form a hollow triangular prism-shaped structural member (see 250 in FIGS. 2B, 2C, 2D and 2H) according to the present invention. Rectangular main panel 200 includes two long edges 202 and two short edges 204. Rectangular main panel 200 may be formed to any suitable length, l. In presently preferred embodiments, rectangular main panel 200 may be formed to predefined lengths, l, of approximately 5' and approximately 10' lengths as measured along long edges 202. Rectangular main panel 200 includes a first fold line 206 coinciding with a centerline that bisects the main panel 200 lengthwise. Rectangular main panel 200 further includes second 208 and third fold lines 210. As shown in FIG. 2A, all of the fold lines 206, 208, 210 are parallel to the long edges 202. Once folded, the fold lines 206, 208, 210 form the vertices (212 as shown in FIGS. 2D and 2H) of the triangular prism-shaped structural member (not shown in FIG. 2A, but see 250 in FIGS. 2B, 2C, 2D and 2H).

Once folded, rectangular main panel 200 forms two sides 216, two lips 218 along a third side and two open ends 222 of a hollow triangular prism-shaped structural member (250 as shown in FIG. 2H) with a gap 226 along the third side. Rectangular main panel 200 may optionally include a plurality of cut-outs 214 generally formed in the two sides 216. Cut-outs 214 may be of any suitable shape including the generally rounded alternating triangular shape illustrated in FIGS. 2A-C, 2E and 2H. FIG. 2E illustrates a portion of FIG. 2A in detail. FIG. 2E shows cut-outs 214 and rows of mounting holes 220. The dimensions shown in FIG. 2E are exemplary of a particular embodiment and are not meant to be limiting. FIG. 2G is another detailed view of a portion of the rectangular main panel 200 as indicated on FIG. 2A. As shown in FIG. 2G, rectangular main panel 200 may include an orientation notch 224 used during assembly of a plurality of hollow triangular prism-shaped structural members 250.

FIG. 2B is a side view of a hollow triangular prism-shaped structural member 250 formed from the rectangular main panel of FIG. 2A. FIG. 2B illustrates cut-outs 214 along one side 216. FIG. 2B also illustrates rows (two rows shown in FIG. 2B and six rows shown in FIG. 2A) of mounting holes 220 along one side 216 that may be used for mounting racks (not shown in FIGS. 2A-H) or for other equipment (also not shown for clarity). Structural member 250 may have any suitable height, h. According to a particular embodiment, height, h, may be approximately 17.6".

FIG. 2C is a top view of the hollow triangular prism-shaped structural member 250 shown in FIG. 2B. FIG. 2C illustrates the rows of mounting holes 220, fold lines 206, 208 and 210, short edges 204 and cut-outs 214. In a rail system application (explained in greater detail below) for the hollow triangular prism-shaped structural member 250, a wheel of a car (not shown) may rest on the crown (or vertex 212) formed by fold line 206.

FIG. 2D is an end view of the hollow triangular prism-shaped structural member 250 shown in FIG. 2B. FIG. 2D illustrates vertices 212 of an equilateral triangle cross-section of the hollow triangular prism-shaped structural member 250 having three sides 216. FIG. 2D also illustrates gap 226 between lips 218. Sides 216 may be of any suitable width. According to the illustrated embodiment, sides 216 have widths of approximately 20". It will be understood that the widths of sides 216 may be of any suitable dimension depending on the application. The circled detail of FIG. 2D is shown in FIG. 2F. More particularly, FIG. 2F is a detailed view of the centerline or first fold 206 of the hollow triangular prism-shaped structural member 250 shown in FIG. 2B. A vertex 212 is shown at centerline of first fold 206 between sides 216.

FIG. 2H is a perspective view of a hollow triangular prism-shaped structural member 250 formed from the rectangular main panel 200 shown in FIG. 2A, according to the present invention. FIG. 2H illustrates rows of mounting holes 220, cut-outs 214, open ends 222 and gap 226 between lips 218. As noted above, the cut-outs 214 are optional. The particular dimensions of features of main panel 200 shown in FIGS. 2A-B and 2D-G are merely exemplary of a presently preferred embodiment, i.e., a rail system as further explained below. It will be understood that the dimensions of main panel 200 may be suitably scaled up or down or changed depending on the particular application.

Referring now to FIGS. 3A-C, an embodiment of an elongated rectangular base panel 300 is shown according to the present invention. The base panel 300 is configured to mate with structural member 250 to enclose gap 226. More specifically, FIG. 3A illustrates a top view of the base panel 300, with length, l, a plurality of cut-outs 314, and two rows of mounting holes 320. FIG. 3B is a detailed view of the circled portion of the base panel 300 shown in FIG. 3A. The optional cut-outs 314, like cut-outs 214 (FIGS. 2A-C) reduce the weight (and cost) of an assembly (not shown) made with a plurality of structural members 250 and base panels 300. Cut-outs 314 also allow wind to pass through and water to escape from such assemblies, as may be desirable depending on the application. While the cut-outs 314 are shown as generally rounded rectangular openings, they may take any suitable shape or pattern as long as the strength of the base panel 300 is maintained. The width, m, of base panel 300 and the placement of mounting holes 320 may be any suitable dimension and location, respectively, in order to be mated with structural member 250 at mounting holes 220 along the lips 218. It will be understood that the dimensions of various features of base panel 300 shown in FIG. 3B are merely exemplary and may be scaled up or down or changed depending on the desired size of the end application. FIG. 3C is a perspective view of base panel 300 showing mounting holes 320 and optional cut-outs 314.

Referring now to FIGS. 4A-D, an embodiment of a track 400 is shown according to the present invention. More particularly, FIGS. 4A-D illustrate perspective, side, bottom and end views, respectively, of track 400. As shown in FIG. 4A, track 400 may include a plurality of rail segments 402 (two shown) assembled end-to-end using coupling bars 500 attached within respective mating vertices 412 of the triangular prism-shaped rail segments 402. Each rail segment 402 is comprised of a structural member 250 attached to a base panel 300. FIG. 4B illustrates a side view of track 400 comprised of two adjacent hollow triangular prism-shaped structural members 250 assembled at joint 404, and shown with optional cut-outs 214. FIG. 4C illustrates elongated rectangular base panel 300 having optional cut-outs 314 as assembled to structural member 250. FIGS. 4A-B and D also illustrate a centroid 440 of the track 400 as assembled. Centroid 440 is shown as a dotted line in FIGS. 4A-B and as a point in the end view of FIG. 4D. FIG. 4D further illustrates the attachment of structural member 250 to base panel 300 using nuts and bolts 428 through respective mounting holes 220 in lips 218 and mounting holes 320 in base panel 300. It will be understood that alternative means for attaching structural member 250 to base panel 300 will be readily known to those skilled in the art, for example and not by way of limitation, welding, adhesives, rivets and the like. Such alternative means are considered to be within the scope of the present invention.

It will be readily apparent from FIG. 4D that the cross-section of track 400 formed of a plurality of individual rail segments 402 is generally of the shape of an equilateral triangle. This triangular cross-section provides significant structural advantages (e.g., strength to weight ratio, torsional rigidity, etc.) over other conventional structures, especially in the application of a track for a rail system. The equilateral triangle formed by the cross-section of structural member 250 includes a gap 226 (FIG. 2D) between lips 218 that is effectively closed by the attachment of base panel 300.

Referring now to FIGS. 5A-E, an embodiment of a coupling bar 500 and an embodiment of a coupling bar form 560 are shown according to the present invention. More specifically, FIGS. 5A-D are perspective, front, top and end views of an embodiment of a coupling bar 500. FIG. 5E is a top view of a coupling bar form 560 from which a coupling bar 500 may be formed by bending at the center line 530 to fold wings 532 to an angle of about 60⁰ as shown in FIG. 5D. Each wing 532 may be configured with a plurality (six shown) of optional mounting holes 520. The mounting holes 520 are used to bolt the coupling bar to adjacent vertices 412 (FIG. 4A) of adjacent rail segments 402 (FIG. 4A). As best seen in FIGS. 4A-C, each end of the coupling bar 500 is effectively tapered by the introduction of cut-outs 514 (FIGS. 5A-B and E) between wings 532. The tapers in the ends of each coupling bar 500 simplify the assembly of adjacent rail segments 402 (FIG. 4A) by making it easier to insert pre-assembled coupling bars 500 in one rail segment 402 into the adjacent rail segment 402. Another feature that may be incorporated into a coupling bar 500 is a second bend line (not shown) at a midsection of the coupling bar 500 to facilitate the angle of bend or direction change at a particular junction or joint 404 in the track 400. The second bend line facilitates a better fit and quicker construction of a track 400.

While the attachment of adjacent rail segments 402 is shown with coupling bars 500 and nuts and bolts 428, it will be understood that other means of attachment and configurations of coupling bars 500 are contemplated to be within the scope of the present invention. For example and not by way of limitation, rather than using the coupling bars 500 described, six rectangular bars (not shown) with mounting holes placed two to a vertex 412 may be used instead. However, the coupling bars 500 are presently preferred over such rectangular bars because they provide a stronger joint between adjacent rail segments 402.

An especially useful feature of the rail system disclosed herein is its capacity for dealing with the complications of material thermal expansion over a long length of track. The term "thermal expansion" as used herein contemplates both expansion and contraction of a particular material due to temperature fluctuations. Embodiments of the inventive system of the present invention employ a simple pivot mechanism incorporated within a reaction assembly 690 (FIG. 6A) used to support the track 400. Each reaction frame 660 includes mounting points 606 (FIGS. 6A and 6C in detail) at both ends of the reaction frame 660. More specifically, there are mounting points 606 located in the lateral support brackets 650 that connect the reaction frames 660 to concrete foundations 604. There are also pivot points 806 in the vertical support brackets 800 that connect the reaction frames 660 to the track 400. This allows the thermal expansion of the track 400 to go out one or both directions (dependant on the location of reaction assembly 690) along the track 400. This feature of the inventive rail system eliminates stresses from being built up in the system due to the effects of thermal expansion. Using the novel reaction assemblies 690 and pivot points 806 results in only a slight difference in the height and length of the track 400 along its length, which may easily be compensated for during the system design.

This feature also frees the designer to concentrate on compensating for the forces applied to the reaction assembly 690 resulting from the steepness (inclination) of the track 400 and the loads applied (car or vehicle on the track) from driving or braking forces. The weight of the vehicle (not shown) and track 400 are generally supported in the vertical supports 700. The forces from the overturning loads from the vehicle, passenger weight and wind are also simply applied to the vertical supports 700 in conjunction with the reaction assemblies 690. Additionally the novel rail system with its ability to perform curves allows for additional reaction assemblies 690 to be placed in a long track alignment, thereby trapping the thermal expansion in a curve and allowing the stresses to neutralize into the curve utilizing the pivot points 806 with little impact on the design of the concrete foundations 604 or structural support members such as the vertical support 700 and reaction assembly 690.

While the reaction assembly 690 illustrated in FIG. 6A is a presently preferred means for compensating for thermal expansion, other suitable approaches may also be employed consistent with the teachings of the present invention. For example, thermal expansion may be captured between vertical supports according to one embodiment of the present invention. According to another embodiment of the present invention, thermal expansion may be controlled by selective use of slip connections that allow the track to expand and contract with temperature fluctuations.

Referring now to FIGS. 6A-C, various views of an elevated rail system 600 are shown, according to embodiments of the present invention. More particularly, FIG. 6A illustrates a portion of a track 400 elevated from the ground 602 by vertical supports 700 and a reaction assembly shown generally at arrows 690. The reaction assembly 690 may include four reaction frames 660 (see, FIG. 6B). As shown particularly in FIGS. 6A-B, the vertical supports 700 and reaction assembly 690 may be supported in the ground 602 by concrete foundations 604. As best shown in FIG. 6A, each vertical support 700 may be attached to the track 400 with a vertical support bracket 800. Each reaction frame 660 (there are four shown in FIG. 6B) may also be attached to the track 400 at vertical support brackets 800. Each reaction frame 660 may also be attached to a concrete foundation 604 through a lateral support bracket 650. As further shown in FIG. 6A, each vertical support 700 may be attached to a concrete foundation 604 by a footing frame 738 embedded (not shown, but see FIG. 7E) in the foundation 604.

FIG. 6B illustrates an angled perspective view of the elevated rail system 600 shown in FIG. 6A. FIG. 6B illustrates the four reaction frames 660 used to react to lateral forces applied to the track 400. FIG. 6C illustrates a detailed portion of the lateral support adjustment assembly 680 circled in FIG. 6B. Various nuts, bolts, washers and brackets shown generally at 680 may be used to secure reaction frame 660 to vertical support bracket 800 and allow for adjustment in length of the reaction frame 660. Such arrangements of nuts, bolts, washers and brackets are well known to those of skill in the art and are further explained in greater detail with regard to FIG. 7D below, where a similar adjustment assembly 780 is shown.

It will be appreciated that selected use of vertical supports 700 and reaction frames 660 allows a track 400 to be suspended above ground 602 in virtually any configuration over any ground surface with any incline to form arbitrary lengths of an elevated rail system 600 according to the present invention.

Referring now to FIGS. 7A-E, aspects and features of vertical supports 700 are shown in greater detail according to the present invention. More particularly, FIGS. 7A-D illustrate front, top, side and perspective views of an embodiment of a vertical support 700 according to the present invention. FIG. 7E illustrates a perspective transparent view of a vertical support 700 mounted in a concrete form 604 underneath a ground 602 surface. As shown in FIG. 7A, vertical beam 702 may be configured with any suitable length. Vertical beam 702 may optionally include cut-outs 714 to reduce weight and wind resistance. Vertical beam 702 may be configured to accept adjustment brackets 704 (two shown in FIG. 7A). Vertical beam 702 may also be configured with nuts, bolts and washers 740 for slidably securing adjustment brackets 704 to vertical beam 702. Vertical beam 702 may also be configured with nuts, bolts and washers 728 for mounting to a footing frame 738 (FIG. 7E). As shown in FIG. 7E, footing frame 738 may be a reinforced steel framework for embedding in a concrete form 604 placed underneath or at ground 602 level.

FIGS. 20A-D are front, top, side and perspective drawings of an eccentric bolt and washer assembly 728A shown generally at 728 in FIG. 7C. As shown in FIGS. 20A-D, the eccentric bolt and washer assembly 728A may be formed by welding a hollow hex nut 728B to a bushing 728C. The bushing 728C is configured to fit within large mounting hole 744 (FIG. 7B) and to be held in place with a bolt shown generally at 728 in FIG. 7C. The eccentric bolt and washer assembly 728A is used to adjust the vertical support 700 to plumb or align the vertical support 700 to the correct position under the track 400. This adjustment compensates for any misalignment in the footing frame 738 embedded in a concrete foundation 604 which may not have been plumb or precisely aligned after pouring of the concrete. Alternatively the eccentric bolt and washer assembly 728A can be used to adjust the vertical support 700 in a second axis (not shown) perpendicular to centroid 440. The adjustment in this second axis is for correcting alignment to track connections at joints 404, more specifically to compensate for any misalignment in the concrete foundation 604 not being perpendicular to the centroid 440 or point of tangency at a curve. Both of these adjustments allow the installer of such an elevated rail system 600 to compensate for flaws in the alignment of concrete foundations 604 after curing or to perform final alignment of the track 400 having any flaws (unintended deviations from designed centroid 440) along the length of the track. Both of these adjustments may be used independently or concurrently according to embodiments of the present invention.

As shown in FIG. 7B, adjustment brackets 704 may be configured with a slot 742 for accepting one or more bolts 740 therethrough. The slot 742 allows lengthwise adjustment of the adjustment bracket 704 relative to the vertical beam 702 for the desired height above ground 602 (FIG. 6A). Adjustment brackets 704 may also include a large mounting hole 744 for attachment to a vertical support bracket 800 (FIG. 6A). Vertical beam 702 may include any number of small mounting holes 746 used to secure the adjustment brackets 704 to the vertical beam 702 using nuts, bolts and washers 740. FIG. 7C illustrates the "C" shaped cross-section of vertical beam 702 with the adjustment brackets 704 secured in opposing channels shown generally at 748.

FIG. 7D is a perspective view of a vertical support 700 illustrating a vertical adjustment assembly 780 used for precisely positioning the adjustment bracket 704 relative to vertical beam 702. More particularly, FIG. 7D shows adjustment bracket 704 to have a "C" shaped cross-section with a flange 752 disposed from a bottom end 754. A long threaded bolt 756 is secured to flange 752 and a separate flange 758 mounted to vertical beam 702 in channel 748 with additional nuts 760 and optional washers (not shown for clarity). Vertical adjustment of the adjustment bracket 704 relative to the vertical beam 702 may be achieved by rotating a nut along threaded bolt 756 thereby acting upon flanges 752 and 758. Once a desired position has been achieved, the nuts, bolts and washers 740 in slots 742 may be used to secure the position of the adjustment bracket 704 in the channel 748 of the vertical beam 702. It will be understood that other means for vertically adjusting the precise height of the vertical supports 700 will be known to those skilled in the art. Such other means for making vertical adjustments are considered to be within the scope of the present invention.

Figure 8D:
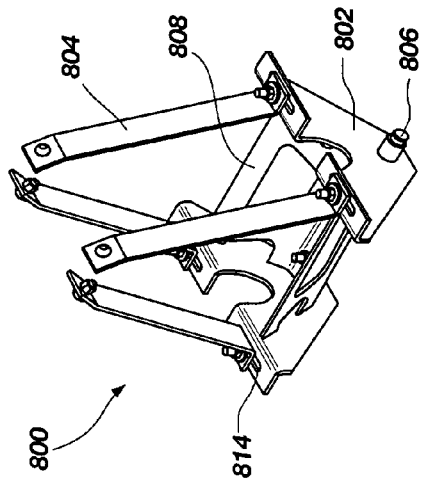
FIGS. 8A-D illustrate front, side, top and perspective views of an embodiment of a vertical support bracket according to the present invention.
Figure 8A:
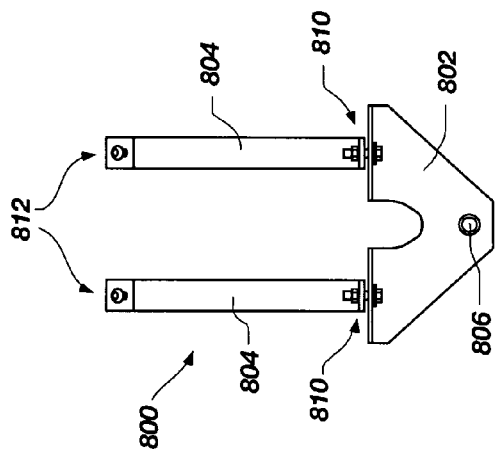

Referring now to FIGS. 8A-D, front, side, top and perspective views of an embodiment of a vertical support bracket 800 are shown according to the present invention. As shown in FIG. 8A, vertical support bracket 800 may include a frame 802 supporting a plurality of struts 804. Frame 802 supports a pivoting mount 806 configured to mate with large mounting holes 744 (FIG. 7B) of the adjustment brackets 704 (FIG. 7B).

Figure 8C:
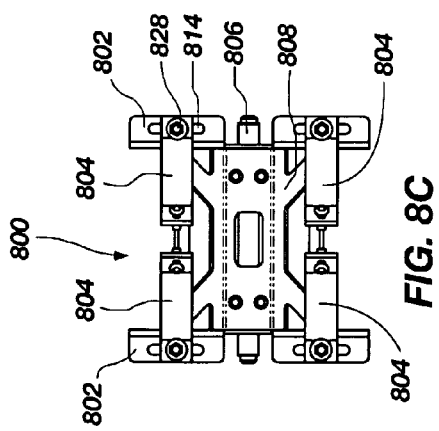
Figure 8B:
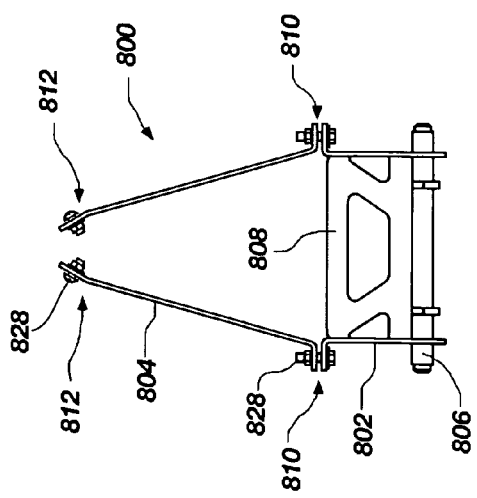

As shown in FIG. 8B, each of the struts 804 (two shown) may be configured for attachment to frame 802 at one end shown generally at 810 (FIGS. 8A-B) and to the inside of structural member 250 (FIG. 2B) at the other end shown generally at 812 (FIGS. 8A-B) using nuts, bolts and washers 828 as necessary. Frame 802 may further include webbing 808 for additional structural rigidity and strength. FIG. 8C illustrates a top view of an embodiment of a vertical support bracket 800. Lateral adjustability of the struts 804 may be facilitated by slots 814 in the frame 802 for receiving the nuts, bolts and washers 828.

FIGS. 9A-C illustrate front, cross-section and perspective views of the attachment of vertical support bracket 800 to adjacent rail segments 402 (see also FIG. 4A) of track 400 (see also FIGS. 4A-D). As shown in FIG. 9A, struts 804 may be bolted 828 to mounting holes 220 from within structural member 250. The cross-section view of FIG. 9B illustrates the internal placement of the struts 804 (two shown) within structural member 250. As shown in FIGS. 9A-B, nuts, bolts and washers 928 may be used to secure the frame 802 to the base panel 300 (FIG. 9B). FIG. 9C illustrates a perspective view of the attachment of vertical support bracket 800 to adjacent rail segments 402 of track 400.

Referring again to FIG. 5E, each wing 532 of coupling bar 500 may have a plurality of notches 534 formed along opposing edges 536 used for identification purposes. The notches 534 may correspond to various configurations of the coupling bars 500 used to introduce curves in a track 400. The various configurations of the coupling bars 500 relate to a specified center spacing, s, as shown in FIG. 5E, namely the spacing between the adjacent rows of mounting holes 520. By having a selectively variable distance, a, selective amounts of bend may be placed at the vertices 212 between adjacent rail segments 402, thereby facilitating curves in track 400. Generally, the greater the center spacing, s, the more bend may be introduced at the junction of two rail segments 402. Table 1 below shows exemplary coupling bar 500 configurations based on the selectively variable center spacing, s, as that distance corresponds to notches 534 along an edge 536 of wing 532.

TABLE 1

| s (inches) | # of notches formed in edge along wing |
|---|---|
| 3.000 | 0 |
| 3.063 | 1 |
| 3.125 | 2 |
| 3.188 | 3 |
| 3.250 | 4 |
| 3.313 | 5 |

In this way, track curvature may be varied significantly. FIGS. 5A-E, for example, illustrate s=3.313 inches.

Figure 10:
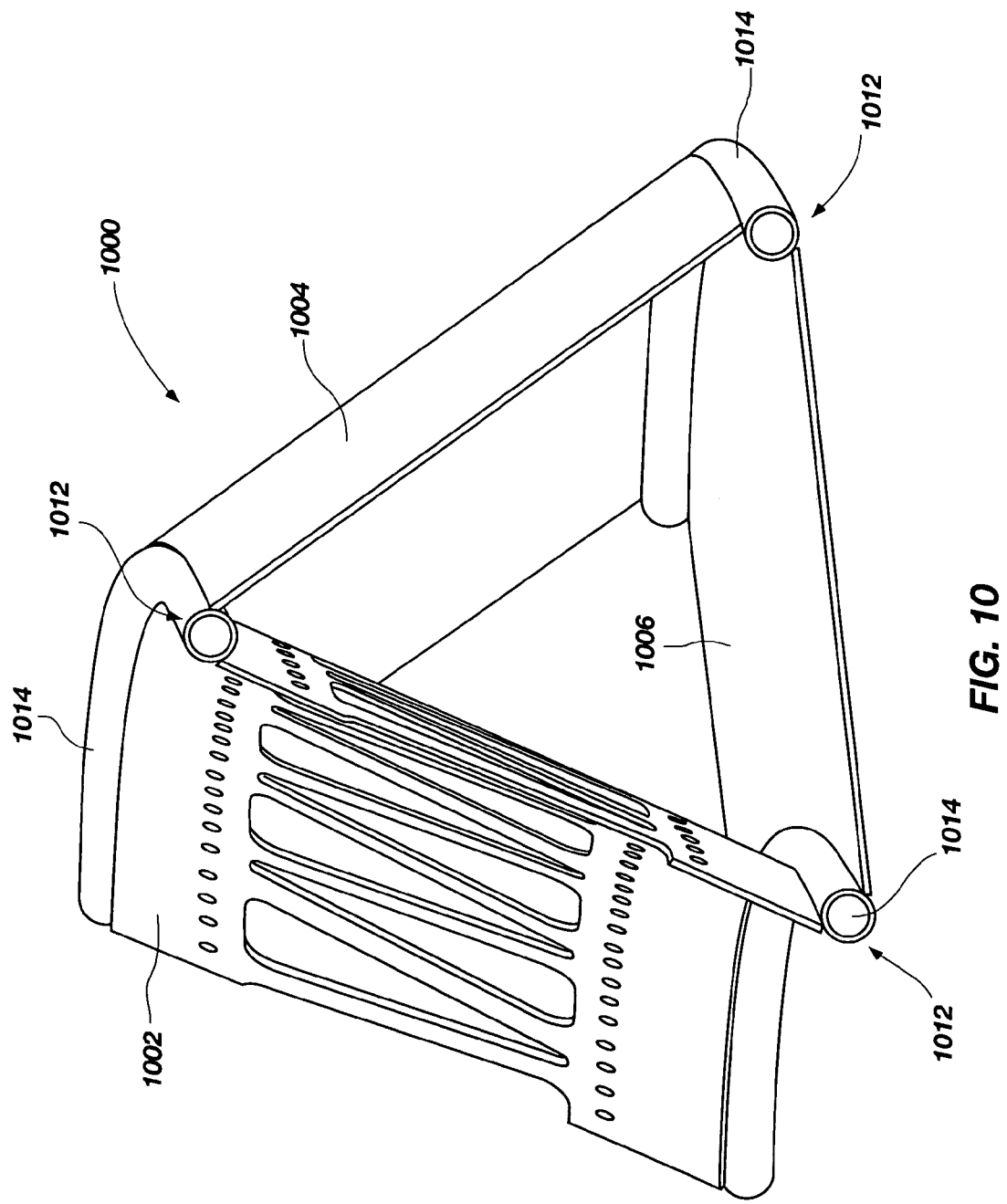
FIG. 10 is an embodiment of a curved rail segment according to the present invention.

The introduction of curves in a track 400 of a rail system 600 according to the present invention may be facilitated by using shorter straight rail segments 402. For example a particular curvature may be achieved by using 10' rail segments 402. Tighter curves in a track 400 may be achieved by using 5' lengths of rail segments 402. Still tighter curves may be achieved by using 2.5' lengths of rail segments 402 and so on, until custom curved rail segments may be necessary.

Where greater track curvature is needed than can be accommodated using various lengths of straight rail segments 402 with curves introduced as bends at junctions with the various coupling bars 500 configurations, special preformed curved track sections may be introduced. For example, FIG. 10 is a drawing of an embodiment of a curved rail segment 1000. Curved rail segment 1000 may be formed from inside 1002, outside 1004 and bottom 1006 panels joined at three vertices 1012. The vertices 1012 may be reinforced with piping 1014, welded, or otherwise attached to the adjacent panels 1002, 1004 and 1006 at the vertices 1012. By selectively using curved rail segments 1000 at selected junctions between straight rail segments 402, greater curvature may be achieved at various points along a given track 400.

In order to use an autonomous car (not shown) with the novel tracks 400 describe herein, some form of drive mechanism (not shown) is needed to propel the car along the track 400. One such drive mechanism is an electric motor (not shown) with pinion gear (not shown) configured to mate with a rack 1150. FIGS. 11A-C illustrate side, end and detailed top views of a track 1100 with a rack 1150 according to embodiments of the present invention.

More particularly, FIG. 11A illustrates an end view of a rail segment 402 comprising a structural member 250 with base panel 300 forming a generally triangular cross-section. FIG. 11A further shows a rack 1150 mounted to structural member 250 with a rack bracket 1120. FIGS. 21A-E illustrate front, top, side and perspective views of rack bracket 1120 and a flat template 1120A from which a rack bracket 1120 may be patterned and formed according to an embodiment of the present invention. Rack bracket 1120 may have a generally "C" shaped cross-section with a first flange 1122 and slotted holes 1130 configured to mate with mounting holes 320 (FIG. 3A) of structural member 250. Rack bracket 1120 further includes a second flange 1126 separated from, and generally parallel to, the first flange 1122 by intermediate section 1124 which is disposed perpendicular to flanges 1122 and 1126. Second flange 1126 is configured with a slotted hole 1130 to mount to rack mounting holes 1220 of rack 1150.

Returning to FIG. 11A, the rack 1150 may be mounted to rack bracket 1120 with nuts, bolts and washers 1128 as shown in FIG. 11A. Similarly, the rack bracket 1120 may be mounted to structural member 250 with nuts, bolts and washers 1128 as shown in FIG. 11A. Placement and spacing of the rack brackets 1120 may be selected to assure the strength and rigidity of the rack 1150 for a particular transportation application.

Racks 1150 may be formed of a plurality of rack segments 1152 (FIG. 11B) each of any suitable length sufficient for attachment in serial fashion to form a rack 1150 that may be placed adjacent to a surface of the structural member 250 of track 1100 for any distance along track 1100 as may be needed. For example, and not by way of limitation, rack segments 1152 may come in lengths of 30", 45", 60", 75" and 120" to allow for modular assembly of a rack 1150. Furthermore, though not illustrated, dual parallel racks mounted along the same face (one rack 1150 mounted above the other), or different faces (one rack 1150 on each of opposing sides), of track 1100 are also contemplated to be within the scope of the present invention. Such dual rack embodiments of the present invention may be used depending on the driving forces and the dispersal of loads required for a given track application.

FIG. 11B shows a side view of track 1100 with rack 1150. The left side of FIG. 11B is indicated as "TOP STATION" and the right side of FIG. 11B is indicated as "BASE STATION" in accordance with a point-to-point track 1100 embodiment that may traverse a hill, for example. FIG. 11B further illustrates rack segments 1152 joined end-to-end or serially at joints 1104 as an assembly to form the rack 1150. It will be understood that the dimensions shown in FIG. 11B are exemplary only and may be scaled or changed for particular applications of the inventive rail system of the present invention. The dimensions illustrated in FIGS. 11A-B are merely exemplary of particular embodiments of the present invention. Other suitable dimensions, for example scaling or otherwise, are considered to be within the scope of the present invention.

FIG. 11C is a detailed portion of a top view of track 1100 with rack 1150 as indicated by the arrows in FIG. 11B. As shown in FIG. 11C, the upper pair of nuts, bolts and washers 1128 may be staggered (lateral shifting) relative to the lower pair of nuts, bolts and washers 1128 for ease of installation. It will be understood that this staggering need not occur in other embodiments consistent with the present invention. It should be noted that because of the individual shape of each joint 1104 alignment that each of the vertices of the track 1100 may have different lengths of spacing relative to each other and to the track centroid. For this reason the mounting holes for the rack brackets 1120 and rack 1150 are deliberately selected such that the rack 1150 can be strung as an independent member relative to the track 1100 for any difference in length between the rack 1150 and track 1100 as may be required. As shown in FIGS. 21A-E, the slotted holes 1130 in the rack brackets 1120 are deliberately elongated (slotted) on first 1122 and second flanges 1126, i.e., where the rack bracket 1120 attaches to the rack 1150 and where it attaches to the track 1100. The slotted holes are configured to roughly correspond with the spacing of the mounting holes 220 in the track 1100 and mounting holes 1220 of the rack 1150. The slotted holes 1130 allow for a "shift" in the mounting points between the rack 1150 and the track 1100. It should also be noted that the rack 1150 can be made from various materials including but not limited to nylon and other plastics as well as other metal types depending on the requirements of the rail system 600.

FIGS. 12A-D illustrate front, top, side and detailed views of an embodiment of a rack segment 1152, according to the present invention. As shown in FIG. 12A, the rack segment 1152 is comprised of a plurality of regularly spaced teeth 1202 and a plurality of mounting holes 1220. The teeth 1202 of rack segment 1152 are configured to cooperate with a pinion gear (not shown) attached to a motor (not shown) of a car (not shown), thus enabling the car to traverse the track 1100 (FIG. 11B). Mounting holes 1220 are used to attach the rack segment 1152 to a rack bracket 1120 (FIG. 11A). FIGS. 12B-C illustrate top and side views of the rack segment 1152, respectively. The dimensions shown in FIGS. 12B-C are exemplary and not intended to be limiting of the invention. For example, the nominal length of approximately 30" shown for rack segment 1152 is for one particular embodiment. Other embodiments of rack segment 1152 may include lengths of approximately 45", 60", 75" and 120". These rack segment 1152 lengths may or may not coincide with lengths of rail segments 402 (FIG. 4A). It will be understood that any length of rack 1150 (or rack segments 1152) for use with track 1100 (FIG. 11B) is consistent with the principles of the present invention. Similarly, in FIG. 12C, the presently preferred thickness of rack segment 1152 (and rack 1150) is shown to be ¼". However, it will be understood that other thicknesses (thicker or thinner) sufficient for the application described herein are contemplated to be within the scope of the present invention and may be preferred for other applications or loading constraints.

FIG. 12D is a detailed view of a portion of the rack segment 1152 as indicated by the circular arrows in FIG. 12A. It will be understood that the particular dimensions illustrated in FIGS. 12A-D are merely exemplary of particular embodiments of the present invention. Other suitable dimensions, for example scaling or otherwise, are considered to be within the scope of the present invention.

Figure 13:
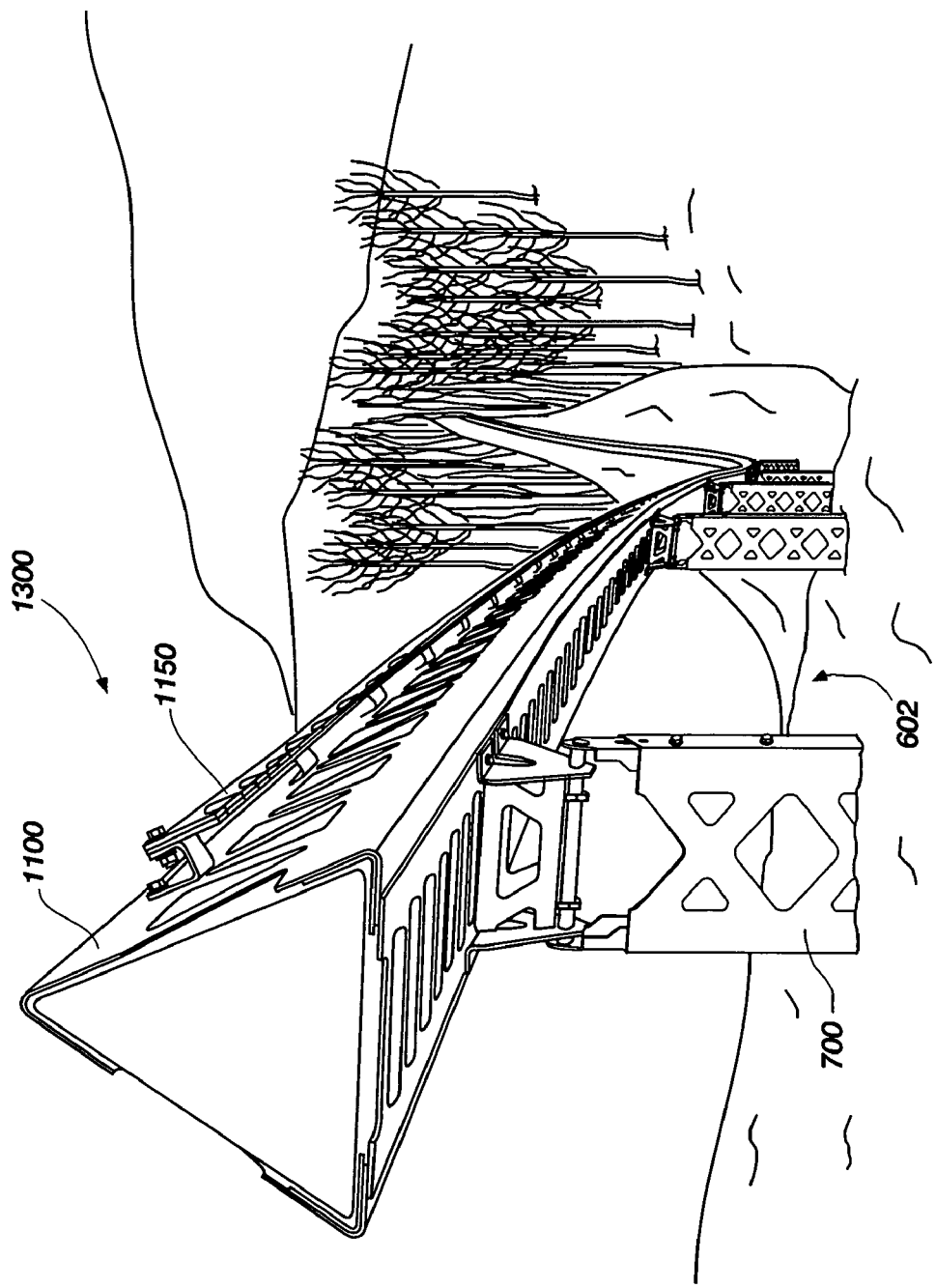
FIGS. 13-15 illustrate various perspective views of an embodiment of a rail system 1300, according to the present invention.
Figure 14:
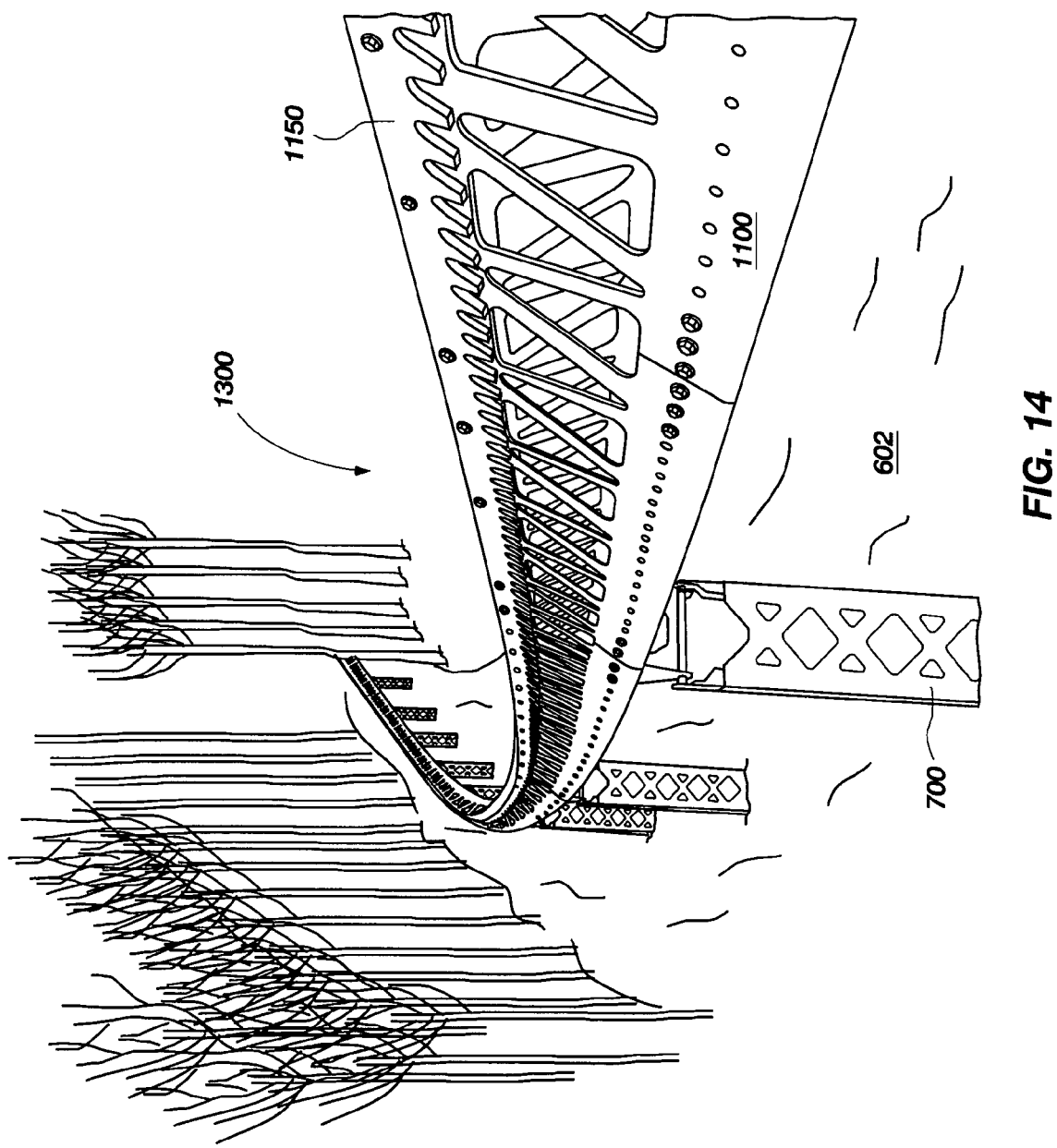
Figure 15:
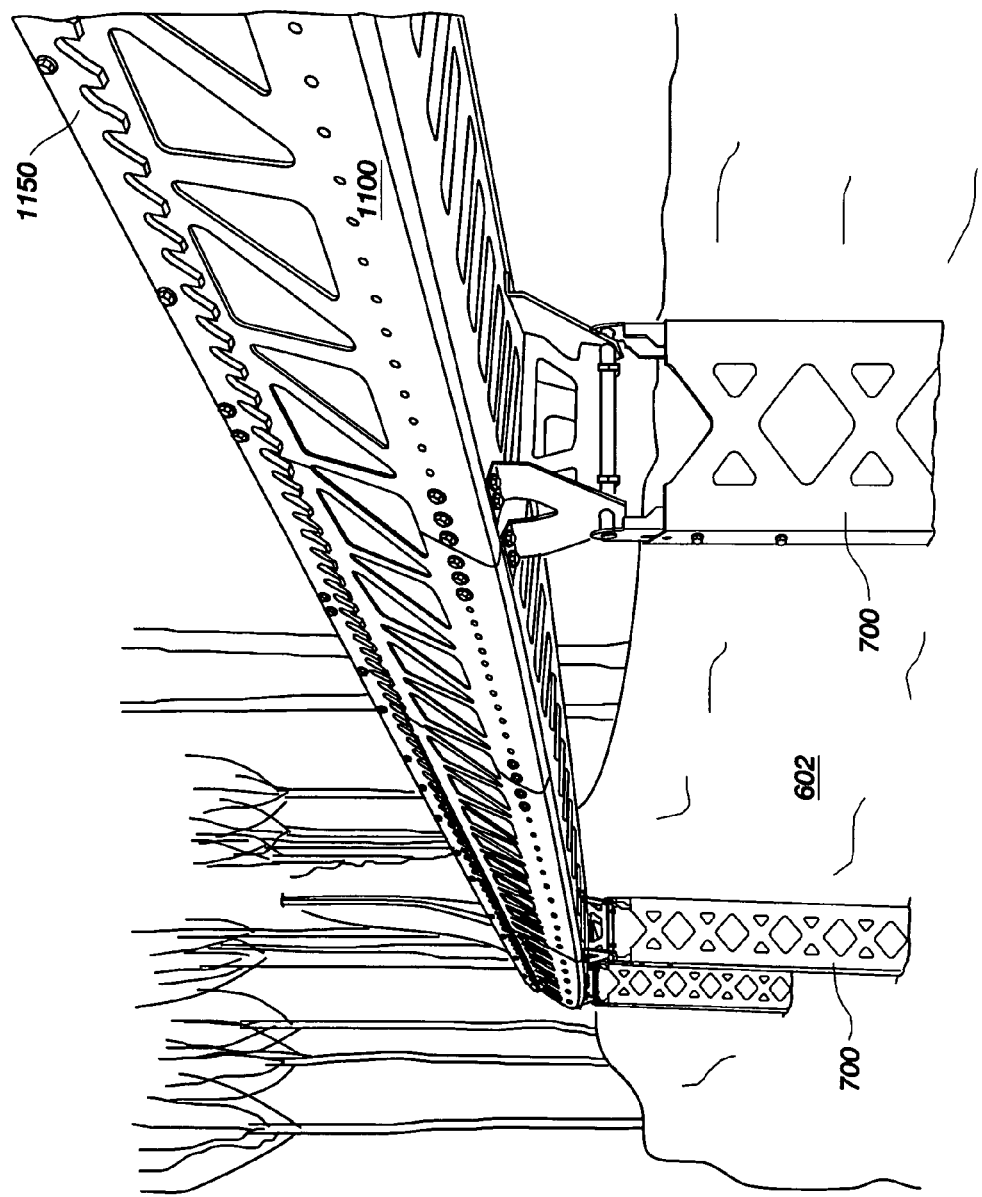

Referring now to FIGS. 13-15, various views of an embodiment of a rail system 1300 are shown according to the present invention. FIG. 13 illustrates a perspective view looking down from the top station 1302 or end point of the rail system 1300 in an actual installation on a mountain. As shown in FIG. 13, rail system 1300 may include a track 1100 supported above ground 602 by vertical supports 700. FIG. 13 also illustrates rack 1150 installed on track 1100. FIG. 14 is another view of rail system 1300 looking up from an intermediate location between a base station (not shown) and top station 1302 (FIG. 13). FIG. 15 illustrates another view of rail system 1300 looking up from another intermediate location between a base station (not shown) and top station 1302 (FIG. 13). FIGS. 14 and 15 both illustrate the track 1100 with rack 1150 supported by vertical supports 700 above ground 602.

A particular embodiment of a rail system 1300 may include a plurality of rail segments 402. The quantity of rail segments 402 may be determined by the particular application for rail system 1300, e.g., the distance from a base station to a top station. Each rail segment 402 may include a triangular prism-shaped structural member 250 having an equilateral triangle cross-section, wherein one side of the equilateral triangle includes a gap between two opposed co-planar lips 218 extending from adjacent vertices 412. Each rail segment 402 may further include an elongated rectangular base panel 300 connected to the lips 218 of the structural member 250, thereby closing the gap 226.

The embodiment of a rail system 1300 may further include a plurality of coupling bars 500 configured for attaching the plurality of rail segments 402 end-to-end from inside adjacent vertices 412 of adjacent end-to-end rail segments 402 to form a track 400. According to another embodiment, rail system 1300 may further include a rack 1150 configured to be attached to a surface of the track 1100. The rack 1150 may be configured with teeth 1202 for receiving and engaging a pinion gear (not shown). According to yet another embodiment, rail system 1300 may further include a plurality of rack brackets 1120 each configured for mounting the rack 1150 to the track 1100. According to yet another embodiment of rail system 1300, each of the rack brackets 1120 is configured to hold the rack 1150 at a fixed distance parallel to the track 1100. According to another embodiment of rail system 1300, the rack 1150 may further include a plurality of rack segments 1152 configured to be placed together serially to form a rack 1150 of arbitrary length.

Another embodiment of rail system 1300 may further include a plurality of vertical supports 700 for supporting the track 400, 1100 above ground 602. According to another embodiment of rail system 1300, each vertical support 700 may include a vertical beam 702. According to this embodiment, vertical support 700 may further include a vertical support bracket 800 configured to attach the vertical beam 702 to the track 400, 1100. According to this embodiment, vertical support 700 may further include a footing frame 738 configured for placement into a concrete footing or foundation 604 and configured for attachment to the vertical beam 702. According to this embodiment, the length of the vertical beam 702 may be adjustable for precise placement of the track 400, 1100 above ground 602.

Another embodiment of rail system 1300 may further include at least one reaction assembly 690 for providing lateral support to a track 400, 1100. According to this embodiment, the reaction assembly 690 may include four reaction frames 660 each adjustable in length and configured with a first end attachable to vertical support brackets 800 attached to the track 400, 1100. According to this embodiment, the reaction assembly 690 may further include a lateral support bracket 650 configured for placement in a concrete footing or foundation 604 and configured for receiving a second end of each of the four reaction frames 660.

It will be understood that the rail system 1300 disclosed herein may used over virtually any suitable terrain topography for transporting payloads. The types of payload carried on rail system 1300 are also virtually unlimited, for example and not by way of limitation, people, equipment, goods, ore, etc. The flexibility of rail system 1300 may also be visualized by describing or illustrating, in map view, a path or paths traversed along the centroid 440 (FIGS. 4A-B and 4D) of the track 400, 1100.

Figure 16A:
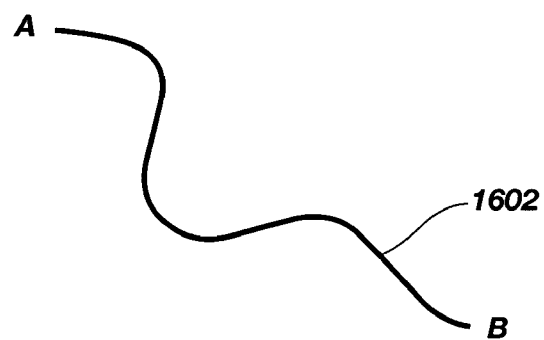
FIGS. 16A-C illustrate exemplary topologies of paths which may be traversed by a rail system, according to the present invention.
Figure 16B:
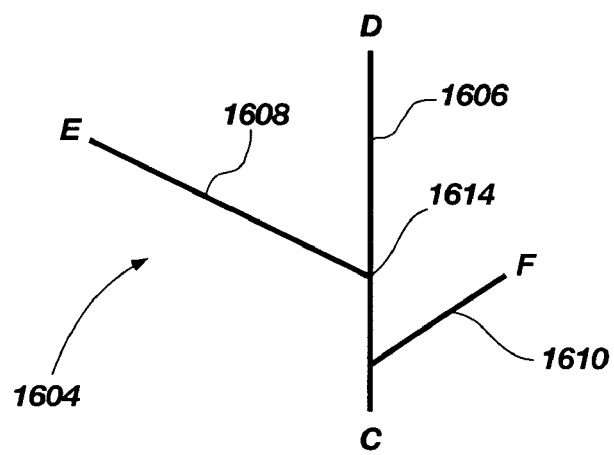
Figure 16C:
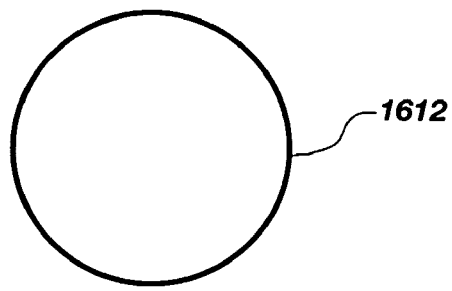

Referring to FIGS. 16A-C, exemplary paths which may be traversed by rail system 1300 are shown. More particularly, in FIG. 16A, a path 1602 between points A and B is shown. Path 1602 may traverse level ground or may traverse hills and valleys as the application requires. FIG. 16B illustrates a path, shown generally at arrow 1604, which has a main trunk line 1606 running between points C and D. Path 1604 also includes spurs 1608 and 1610 branching from the main trunk line 1606 to points E and F, respectively. FIG. 16C illustrates a circular path 1612 which may have any number of stops (not shown) along its circumference. It will be understood that rail system 1300 may be configured with any combination or subset of paths 1602, 1604 and 1612, consistent with the present invention.

According to one embodiment of rail system 1300, a track centroid 440 traverses a non-linear path. According to another embodiment of rail system 1300, the path 1602 connects two points (A and B) in a point-to-point configuration. According to yet another embodiment of rail system 1300, the path may include a main trunk line 1606 with at least one spur 1608 and 1610. In still another embodiment of rail system 1300, the path 1612 includes at least one loop.

Junctions 1614 in the main trunk line 1606 may be effected in many ways known to one of skill in the art. For example, the use of a perpendicularly sliding track portion (not shown, but commonly used in amusement park rides) may be used to selectively switch a vehicle onto a spur 1608 and 1610. Such a perpendicularly sliding track portion has two positions. In the first position a vehicle passes straight through as if there were no junction 1614. In the second position obtained by shifting the perpendicularly sliding track portion at 900 (perpendicular) to the direction of vehicle travel along the track, a curved portion of track within the perpendicularly sliding track portion directs a vehicle to the spur 1608 or 1610.

The elevated rail system 600 of the present invention utilizes simple components, that are easily assembled and is economical to produce. The simplicity of the system reduces the track design process substantially. The elevated rail system 600 of the present invention is preferable to prior art approaches for dealing with the problems associated with thermal expansion in a long track system.

The embodiment of rail segments 402 formed from folding rectangular main panel 200 and attaching elongated rectangular base panel 300 disclosed herein is only one method of forming a structural member having a triangular cross-section or triangular prism shape. Other embodiments utilizing one or two components selectively processed or assembled are also disclosed herein.

Figure 17A:
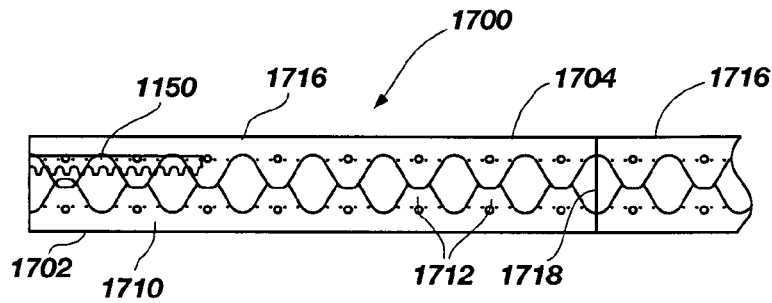
FIGS. 17A-C illustrate another embodiment of a triangular prism-shaped rail segment formed from a bottom plate and a top rib, according to the present invention.
Figure 17B:
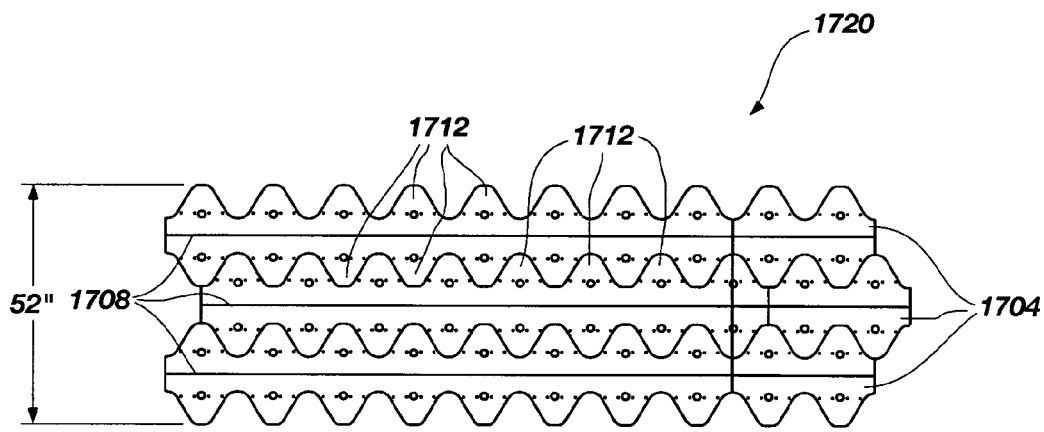
Figure 17C:
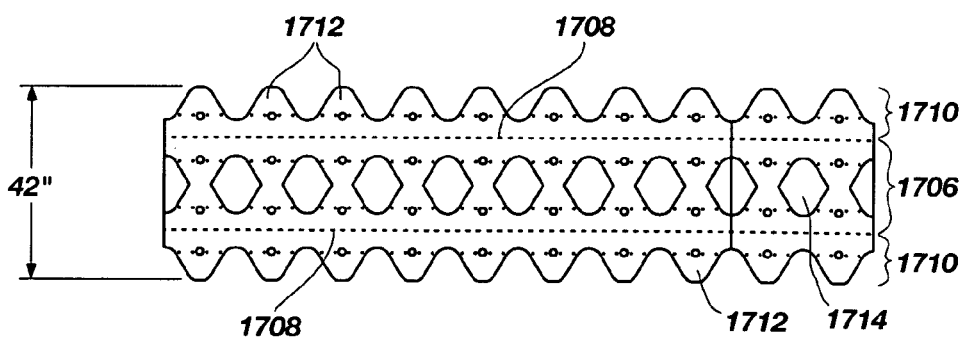

Referring to FIGS. 17A-C another embodiment of a triangular prism-shaped rail segment 1716 formed from a bottom plate 1702 and a top rib 1704 is illustrated, according to the present invention. More particularly, FIG. 17C illustrates a top view of an unfolded bottom plate 1702 having a bottom portion 1706 between two fold lines 1708. Bottom plate 1702 may include two leafs 1710 configured to be folded up and toward bottom portion 1706, each at an angle of 60° relative to the bottom portion 1706. The unfolded bottom plate 1702 may be formed from a section of galvanized steel or other material in any suitable width, 42" shown. The galvanized steel or other material may be of any suitable gauge, for example and not by way of limitation, 11 gauge steel. The bottom plate 1702 may include optional cut-outs 1714 to allow water and wind to pass through rail segments 1716 (FIG. 17A). Each rail segment 1716 may be joined at a joint 1718, using coupling bars 500 (FIGS. 4A-D) or other means of securing as known to those skilled in the art. Each leaf 1710 may be formed of a plurality of teeth 1712.

FIG. 17B is a top view of sheet stock 1720 which may be used to cut three unfolded top ribs 1704. Sheet stock 1720 may have any suitable width, e.g., 52" shown. Each top rib 1704 includes a fold line 1708 and a plurality of regularly spaced teeth 1712. Each unfolded top rib 1704 is configured to be folded along fold line 1708 such that opposing teeth 1712 are at an angle of 60° relative to one another.

FIG. 17A illustrates a side view of portions of two triangular prism-shaped rail segments 1716 assembled end-to-end at joint 1718 as a track 1700. Each triangular prism-shaped rail segment 1716 may be formed from a folded bottom plate 1702 mated with a top rib 1704. The mating of bottom plate 1702 to top rib 1704 may be achieved by overlapping corresponding teeth 1712 and welding or fastening with nuts and bolts (not shown) as known to those skilled in the art. A rack 1150 may be attached to the assembled triangular prism-shaped rail segment 1716 as shown in FIG. 17A. In this way, triangular prism-shaped rail segments 1716, each having an equilateral triangle cross-section, may be formed. It will be understood that each side of the equilateral triangle may have any suitable dimension, e.g., approximately 20" in the illustrated embodiment. Track 1700 may be supported above ground with vertical supports 700 and reaction assemblies 690 as disclosed herein.

Referring now to FIGS. 18A-B, yet another embodiment of a triangular prism-shaped rail segment 1806 formed of a single sheet stock 1802 is shown, according to the present invention. More specifically, FIG. 18B illustrates a top view of a sheet stock 1802 with three panels 1804 separated by two fold lines 1808. Sheet stock 1802 may be formed of any suitable material, for example and not by way of limitation, galvanized steel. It will be understood that sheet stock 1802 may be formed with any suitable thickness of material, for example 10 gauge steel as shown in FIG. 18B. It will also be understood that the dimensions of sheet stock 1802 may be arbitrarily selected depending on the particular application. For example and not by way of limitation, sheet stock 1802 may have a width of approximately 48" and a length of approximately 120" as shown in FIG. 18B. Folding sheet stock 1802 along fold lines 1808, so that the outside panels 1804 are folded in toward the center panel 1804, a triangular prism-shaped rail segment 1806 may be formed. FIG. 18A is a side view of two triangular prism-shaped rail segments 1806 assembled end-to-end at joint 1818 to form a portion of a track 1800. Track 1800 may be supported above ground with vertical supports 700 and reaction assemblies 690 as disclosed herein.

The equilateral triangle cross-section of rail segments 402 (FIG. 4A) is a presently preferred configuration of the structural members 250 (FIGS. 2B-D) disclosed herein. However, it will be understood that similar hollow structural members may also used for various applications (e.g., rail systems, towers and the like) consistent with the inventive concepts of the present invention. FIGS. 19A-F illustrate various alternative embodiments of structural member cross-sections which may be employed for rail systems, towers and the like, consistent with the principles of the present invention. Such structural members may be used to form tracks with racks and support structures for use in a railed transportation system in a manner analogous to track 400 (FIGS. 4A-D) and rail systems 600 and 1300 disclosed herein.

Figure 19A:
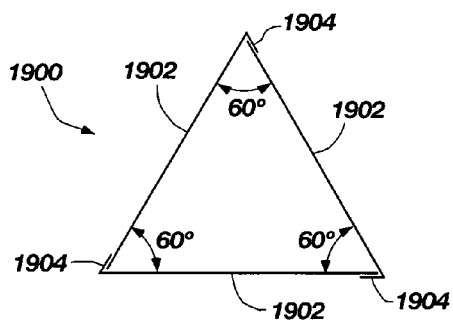
FIGS. 19A-F illustrate various alternative embodiments of structural member cross-sections which may be employed for rail systems, towers and the like, consistent with the principles of the present invention.

More particularly, FIG. 19A illustrates a cross-section view of a generally equilateral triangular cross-sectioned structural member 1900 which may be formed from flat sheet stock (not shown) folded to form side panels 1902 with lips 1904 for engaging an adjacent side panel 1902. Internal angles may all be approximately 60° as shown to form a cross-section that is approximately an equilateral triangle. Other embodiments having side panels 1902 may employ other internal angles such that the cross-section forms an isosceles triangle, consistent with the present invention.

Figure 19B:
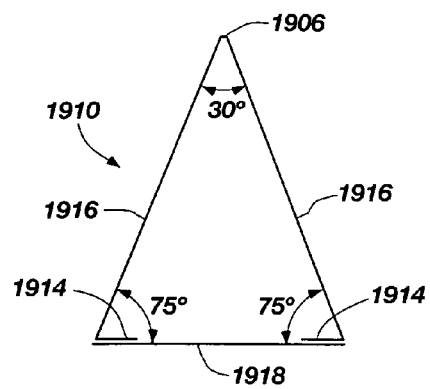

For example, FIG. 19B illustrates a cross-section view of a generally isosceles triangular cross-sectioned structural member 1910. The structural member 1910 may include a triangular prism-shaped structural member 1912 having lips 1914 that are at approximately 75° relative to sides 1916. The triangular prism-shaped structural member 1912 further includes a top vertex having an internal angle of approximately 30° relative to sides 1916. The structural member 1910 may further include a rectangular base panel 1918, similar to rectangular base panel 300 (FIG. 3A), attached to the lips 1914. Attachment of the rectangular base panel 1918 to the lips 1914 of the triangular prism-shaped structural member 1912 may be achieved with nuts and bolts (not shown), clamping mechanisms (not shown), welding (not shown), or any other suitable means for attachment consistent with the principles of the present invention. It will be understood that the particular internal angles shown in FIG. 19B are merely exemplary and other suitable internal angles may be used consistent with the present invention.

Figure 19C:
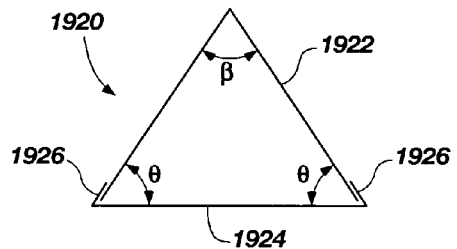

FIG. 19C illustrates a cross-section view of another embodiment of an isosceles triangular cross-sectioned structural member 1920. Structural member 1920 includes a top section 1922 having an inverted "V" cross-section having internal angle, β. Structural member 1920 further includes a bottom section 1924 having lips 1926 angled up to engage top section 1922. Lips 1926 may be configured with any suitable internal angle, Θ, such that 2Θ+β=180°. Attachment of the lips 1926 to the top section 1922 may be achieved with nuts and bolts (not shown), clamping mechanisms (not shown), welding (not shown), or any other suitable means for attachment consistent with the principles of the present invention. It will be readily understood that according to an embodiment where Θ=β, structural member 1920 will have an equilateral triangular cross-section.

Figure 19D:
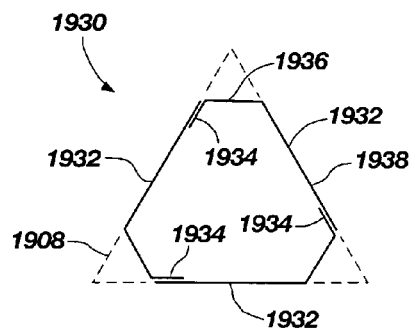

FIG. 19D illustrates a cross-section view of yet another embodiment of a hexagonal cross-sectioned structural member 1930 formed of three panels 1932. Each panel 1932 may be formed from flat sheet stock with suitable bending to form lips 1934, short sides 1936 and long sides 1938. According to structural member 1930, lips 1934 are configured to be attached to a long side 1938 of an adjacent panel 1932. It will be understood that attachment of lips 1934 to long sides 1938 may be achieved with nuts and bolts (not shown), clamping mechanisms (not shown), welding (not shown), or any other suitable means for attachment consistent with the principles of the present invention. In an alternative embodiment of structural member 1930, panels 1932 do not include lips 1934. In this alternative embodiment, the distal ends of each short side 1936 (which would have included lip 1934) attached to a distal end of a long side 1938 in an adjacent panel 1932, for example by welding. As can be seen in FIG. 19D, such a hexagonal cross-sectioned structural member 1930 may fit within a triangular cross-section 1908 (shown in dotted line).

Figure 19E:
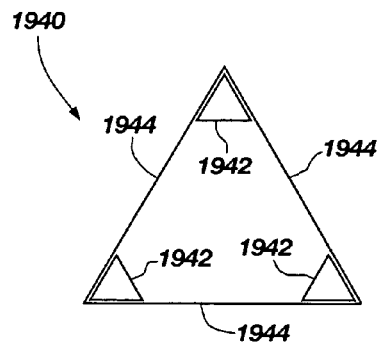

FIG. 19E illustrates a cross-section view of still another embodiment of a triangular cross-sectioned structural member 1940 consistent with the principles of the present invention. Structural member 1940 may include three triangular webs 1942 having a triangular prism-shaped cross section located at each vertex formed by the joining of three side panels 1944. It will be understood that the three side panels 1944 may be formed from a single sheet stock 1802 (FIG. 18B) bent appropriately at fold lines 1808 (FIG. 18B) according to one embodiment and as described herein. Alternatively, each panel 1944 may be a separate panel 1944 to be joined to the webs 1942 using nuts and bolts (not shown), clamping mechanisms (not shown), welding (not shown), or any other suitable means for attachment consistent with the principles of the present invention. The cross-section of structural member may be equilateral (shown) or isosceles, according to various embodiments of the present invention.

Figure 19F:
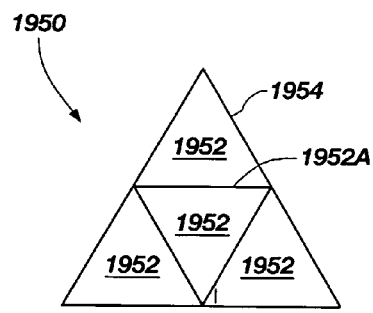
Figure 20D:
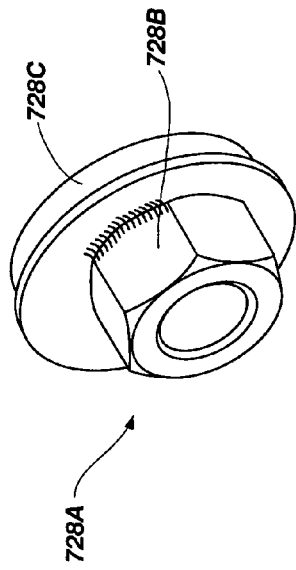
FIGS. 20A-D are front, top, side and perspective drawings of an eccentric bolt and washer assembly, according to the present invention.
Figure 20C:
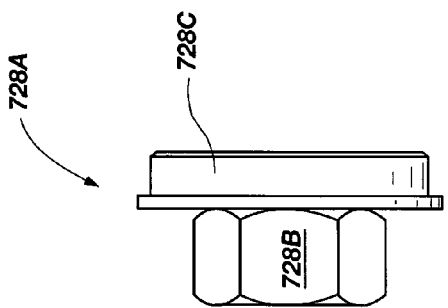
Figure 20B:
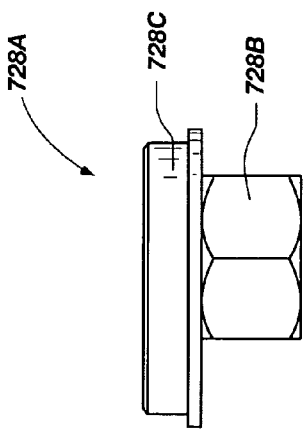
Figure 20A:
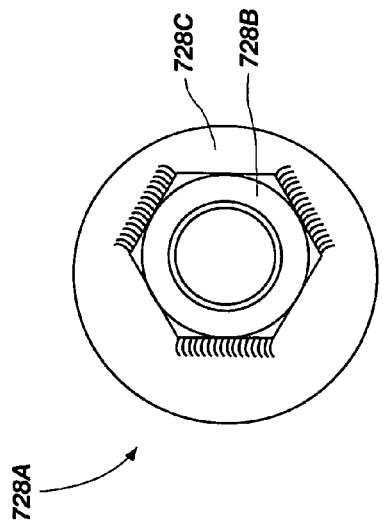

FIG. 19F illustrates a cross-section view of still another embodiment of a triangular cross-sectioned structural member 1950 consistent with the principles of the present invention. According to one embodiment, structural member 1950 may be formed by joining four smaller triangular prism-shaped structural members 1952 together as shown in FIG. 19F. According to another embodiment, structural member 1950 may be formed by placing a center smaller triangular prism-shaped structural member 1952A within a larger outside triangular prism-shaped structural member 1954 and attaching as shown in FIG. 19F. It should also be noted that the generally triangular prism-shaped structural members disclosed herein may also be formed with sides each having a different gauge or thickness of material used to form each panel according to other embodiments of the present invention. Such variations in thickness of specific panels may be used to further customize strength and weight aspects of portions or all of a track in a given application.

Another general embodiment of a rail system is disclosed. The rail system may include a track 400 and 1100 formed of a plurality of elongated hollow structural members joined end-to-end. The elongated hollow structural members may have cross-sections such as structural members 402, 1900, 1910, 1920, 1930, 1940 and 1950 shown herein. The rail system may further include a plurality of vertical supports 700 for elevating the track 400 and 1100 above concrete foundations 604 formed in ground 602. The rail system may further include at least one reaction assembly 690 placed between adjacent vertical supports 700, the track 400 and 1100 and the concrete foundations 604 having pivot points 606 near the track 400 and 1100 and having pivot points 806 near the concrete foundations 604, the reaction assembly 690 allowing for local containment of stresses due to thermal expansion of the track. The outline of a cross-section of the elongated hollow structural member 402, 1900, 1910, 1920, 1930, 1940 and 1950 may be an equilateral triangle, an isosceles triangle or a hexagon.

While the foregoing advantages of the present invention are manifested in the detailed description and illustrated embodiments of the invention, a variety of changes can be made to the configuration, design and construction of the invention to achieve those advantages. For example, it will be understood that one of ordinary skill in the art will readily recognize that various combinations and extensions of the illustrated structural member cross-sections shown in FIGS. 4A-D and 19A-F may be achieved consistent with the principles of the present invention. All of those variations and alternative embodiments are considered to be within the scope of the present invention. Hence, reference herein to specific details of the structure and function of the present invention is by way of example only and not by way of limitation.

What is claimed is:

1. A rail system, comprising:
   a plurality of hollow triangular prism-shaped rail segments, each rail segment forming a piecewise linear segment of the rail system; and
   coupling bars attached inside each vertex of adjacent end-to-end rail segments to form a track, each coupling bar further comprising two planar wings oriented at an angle relative to one another, each of the two wings further comprising a plurality of linearly oriented mounting holes configured for selective use in mounting the wing to corresponding surfaces of two adjacent rail segments.

2. The rail system according to claim 1, wherein the coupling bars comprise variable center spacing, the variable center spacing comprising a center-to-center spacing between two innermost mounting holes linearly oriented along a wing, the two innermost mounting holes attached to adjacent surfaces of two adjacent rail segments.

3. The rail system according to claim 2, wherein selective use of the variable center spacing of the two innermost mounting holes in the coupling bars provides variable bends between the piecewise linear segments of the rail system.

4. The rail system according to claim 1, further comprising at least one curved structural member having triangular cross-section with at least two nonplanar surfaces, the at least one curved structural member configured for end-to-end attachment to the hollow triangular prism-shaped rail segments using the coupling bars at adjacent vertices.

5. The rail system according to claim 1, further comprising a rack attached to a surface of the track, the rack configured with teeth for receiving and engaging a pinion gear.

6. The rail system according to claim 5, further comprising a plurality of rack brackets, each rack bracket mounted between the rack and the track.

7. The rail system according to claim 6, wherein each of the plurality of rack brackets holds the rack at a fixed distance parallel to the track.

8. The rail system according to claim 6, wherein each of the plurality of rack brackets further comprises a C-shaped cross section with first and second flanges oriented parallel to each other and connected to each other by an intermediate section disposed perpendicular to the flanges.

9. The rail system according to claim 8, wherein the first flange comprises slotted holes configured to adjustably mate with mounting holes formed in the rail segments.

10. The rail system according to claim 8, wherein the second flange comprises a slotted hole configured to adjustably mate with rack mounting holes formed in the rack.

11. The rail system according to claim 5, wherein the rack comprises a plurality of rack segments configured to be placed together serially to form a rack of arbitrary length.

12. The rail system according to claim 11, wherein the arbitrary length of the rack differs from a total length of the track.

13. The rail system according to claim 1, further comprising a plurality of vertical supports selectively mounted between the track and a ground surface for supporting the track above ground.

14. The rail system according to claim 13, wherein each vertical support comprises:
- a vertical beam;
- a vertical support bracket configured to attach the vertical beam to the track;
- a footing frame configured for placement into a concrete footing and configured for attachment to the vertical beam; and
- wherein the length of the vertical beam is adjustable for precise placement of the track above ground.

15. The rail system according to claim 1, further comprising at least one reaction assembly for providing lateral support to a track, the reaction assembly comprising:

- four reaction frames, each adjustable in length and configured with a first end attachable to vertical support brackets attached to the track; and
- a lateral support bracket configured for placement in a concrete footing and for receiving a second end of each of the four reaction frames.

16. The rail system according to claim 1, wherein a centroid of the track traverses a non-linear path.

17. The rail system according to claim 16, wherein the path comprises traversing from point-to-point.

18. The rail system according to claim 16, wherein the path comprises a main trunk line with at least one spur.

19. The rail system according to claim 16, wherein the path comprises at least one loop.

20. The rail system according to claim 1, wherein each of the plurality of coupling bars may be configured to allow up to a specified amount of bend in the track at the coupling bar depending on center spacing between adjacent rows of mounting holes formed in the coupling bar.

* * * * *